United States Patent
Gschwind et al.

(10) Patent No.: US 9,304,935 B2
(45) Date of Patent: Apr. 5, 2016

(54) ENHANCING RELIABILITY OF TRANSACTION EXECUTION BY USING TRANSACTION DIGESTS

(71) Applicant: International Business Machines Corporation, Armonk, NY (US)

(72) Inventors: Michael Karl Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 14/163,324

(22) Filed: Jan. 24, 2014

(65) Prior Publication Data

US 2015/0212818 A1 Jul. 30, 2015

(51) Int. Cl.
| | |
|---|---|
| *G06F 11/14* | (2006.01) |
| *G06F 12/08* | (2006.01) |
| *G06F 9/30* | (2006.01) |
| *G06F 9/46* | (2006.01) |

(52) U.S. Cl.
CPC .......... *G06F 12/0875* (2013.01); *G06F 9/3004* (2013.01); *G06F 9/30087* (2013.01); *G06F 9/466* (2013.01); *G06F 11/1474* (2013.01); *G06F 11/1407* (2013.01); *G06F 11/1415* (2013.01)

(58) Field of Classification Search
CPC . G06F 11/14; G06F 11/1405; G06F 11/1407; G06F 11/141; G06F 11/1474; G06F 11/1415
See application file for complete search history.

(56) References Cited

U.S. PATENT DOCUMENTS

| | | | |
|---|---|---|---|
| 5,317,726 A | * | 5/1994 | Horst .................. G06F 11/0724 714/12 |
| 5,586,297 A | | 12/1996 | Bryg et al. |
| 5,835,915 A | * | 11/1998 | Carr .................... G06F 11/1458 707/999.201 |
| 6,327,188 B1 | | 12/2001 | Wada |
| 6,349,361 B1 | | 2/2002 | Altman et al. |
| 7,272,748 B1 | | 9/2007 | Conover et al. |

(Continued)

OTHER PUBLICATIONS

U.S. Appl. No. 14/823,140, filed Aug. 11, 2015, titled "Transactional Execution Diagnostics Using Digest," pp. 1-96.

(Continued)

*Primary Examiner* — Joseph Schell
(74) *Attorney, Agent, or Firm* — David Zwick; William Kinnaman, Jr.

(57) ABSTRACT

Performing a transaction in a transactional memory environment for performing transactional executions, the transactional memory environment including a digest-generating transaction to generate a computed digest and a digest-checking transaction to compare computed digests is provided. Included is identifying, by a computer system, a first indicator signaling a beginning instruction of a digest-generating transaction including a plurality of instructions; suppressing committing memory store data of the digest-generating transaction to memory; generating a computed digest based on the execution of at least one of the plurality of instructions; identifying a second indicator associated with the plurality of instructions signaling an ending instruction of the digest-generating transaction, the computed digest is replicable for an error-free execution of the plurality of instructions; and saving the computed digest, as a reliability digest, based on completing the digest-generating transaction and not save the first computed digest based on an abort of the digest-generating transaction.

11 Claims, 11 Drawing Sheets

(56) References Cited

U.S. PATENT DOCUMENTS

| | | | |
|---|---|---|---|
| 7,512,772 B2 | 3/2009 | Gschwind et al. | |
| 7,752,505 B2 | 7/2010 | Gschwind et al. | |
| 7,752,605 B2 * | 7/2010 | Qadeer | G06F 11/3632 717/124 |
| 7,977,965 B1 | 7/2011 | Fleischer et al. | |
| 8,010,550 B2 | 8/2011 | Duffy et al. | |
| 8,041,900 B2 | 10/2011 | Caprioli et al. | |
| 8,086,827 B2 | 12/2011 | Welc et al. | |
| 8,188,761 B2 | 5/2012 | Fleischer et al. | |
| 8,209,689 B2 | 6/2012 | Raikin et al. | |
| 8,239,633 B2 | 8/2012 | Wood et al. | |
| 8,281,185 B2 | 10/2012 | Nussbaum et al. | |
| 8,316,352 B2 | 11/2012 | Lev et al. | |
| 8,321,637 B2 | 11/2012 | Baum et al. | |
| 8,327,188 B2 * | 12/2012 | Karlsson | G06F 11/1405 714/15 |
| 8,495,607 B2 | 7/2013 | Gschwind | |
| 8,521,961 B2 | 8/2013 | Eichenberger et al. | |
| 2004/0044850 A1 | 3/2004 | George et al. | |
| 2007/0124820 A1 * | 5/2007 | Burch | G06F 21/31 726/26 |
| 2008/0244354 A1 | 10/2008 | Wu et al. | |
| 2008/0244544 A1 | 10/2008 | Neelakantam et al. | |
| 2009/0183035 A1 * | 7/2009 | Butler | G06F 11/1645 714/48 |
| 2009/0198694 A1 | 8/2009 | Thomas | |
| 2009/0288075 A1 | 11/2009 | Song et al. | |
| 2010/0057740 A1 | 3/2010 | Ni et al. | |
| 2010/0174840 A1 | 7/2010 | Blainey et al. | |
| 2010/0325630 A1 | 12/2010 | Flood et al. | |
| 2011/0209155 A1 | 8/2011 | Giampapa et al. | |
| 2011/0219208 A1 | 9/2011 | Asaad et al. | |
| 2011/0246993 A1 | 10/2011 | Moir et al. | |
| 2012/0005461 A1 | 1/2012 | Moir et al. | |
| 2012/0084477 A1 * | 4/2012 | Arndt | G06F 13/24 710/266 |
| 2012/0191977 A1 * | 7/2012 | Foster | H04L 9/3242 713/170 |
| 2012/0210162 A1 | 8/2012 | Gara et al. | |
| 2012/0210164 A1 * | 8/2012 | Gara | G06F 11/1641 714/10 |
| 2012/0210172 A1 | 8/2012 | Gara et al. | |
| 2012/0246658 A1 | 9/2012 | Arndt et al. | |
| 2012/0324472 A1 | 12/2012 | Rossbach et al. | |
| 2013/0007750 A1 | 1/2013 | Beckerle et al. | |
| 2013/0339615 A1 | 12/2013 | Alexander et al. | |
| 2013/0339703 A1 | 12/2013 | Alexander et al. | |

OTHER PUBLICATIONS

U.S. Appl. No. 14/163,297, filed Jan. 24, 2014 entitled: "Indicating a Low Priority Transaction".

U.S. Appl. No. 14/163,345, filed Jan. 24, 2014 entitled: "Transactional Execution Diagnostics Using Digests".

U.S. Appl. No. 14/163,360 filed Jan. 24, 2014 entitled: "Transaction Digest Generation During Nested Transactional Execution".

U.S. Appl. No. 14/163,384, filed Jan. 24, 2014 entitled: "Using Transactional Execution for Reliability and Recovery of Transient Failures".

Proceedings 2012 IEEE/ACM 45th International Symposium on Microarchitecture Micro-45, presented Dec. 1-5, 2012, "Transactional Memory Architecture and Implementation for IBM System z", pp. 25-36.

IBM, "Principles of Operation", Tenth Edition (Sep. 2012), SA22-7832-09.

"Intel® Architecture Instruction Set Extensions Programming Reference", 319433-012A, Feb. 2012.

Austen McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

P. Mak et al., IBM J. Res. & Dev. vol. 53, No. 1, Paper 2, 2009, "IBM System z10 Processor Cache Subsystem Microarchitecture", pp. 2:1-2:12.

Song et al., "Error Detection by Redundant Transaction in Transactional Memory System", 2011 Sixth IEEE International Conference on Networking, Architecture, and Storage, pp. 220-224.

Gschwind et al., IBM Research Report, "SoftBeam: Precise Tracking of Transient Faults and Vulnerability Analysis at Processor Design Time", RC25220 (W905-046) May 18, 2009, IEEE 29th International Conference on Computer Design (ICCD), pp. 404-410, IEEE, 2011, http://domino.research.ibm.com/library/cyberdig.nsf/papers/DCE60F2D3E6188C38525792C00500CD2/$File/rc25220.pdf.

Buti et al., "Organization and implementation of the register-renaming mapper for out-of-order IBM POWER4 processors", IBM J. Res. & Dev., vol. 49, No. 1, Jan. 2005, pp. 167-188.

Sanchez et al., "Implementing Signatures for Transactional Memory", 40th IEEE/ACM International Symposium on Microarchitecture, 2007 IEEE, pp. 123-133.

Gottschlich, Justin et al., "Extending Contention Managers for User-Defined Priority-Based Transactions," Workshop on Exploiting Parallelism with Transactional Memory and other Hardware Assisted Methods (EPHAM), Boston, MA, 2008, 10 pages.

Disclosed Anonymously, "A novel squash and recovery mechanism in transactional memory system", IP.com, IPCOM000196579D, Jun. 7, 2010.

Peng et al., "Conflict Detection Via Adaptive Signature for Software Transactional Memory", 2010 2nd International Conference on Computer Engineering and Technology (ICCET), vol. 2, Apr. 2010, pp. V2-306-V2-310.

* cited by examiner

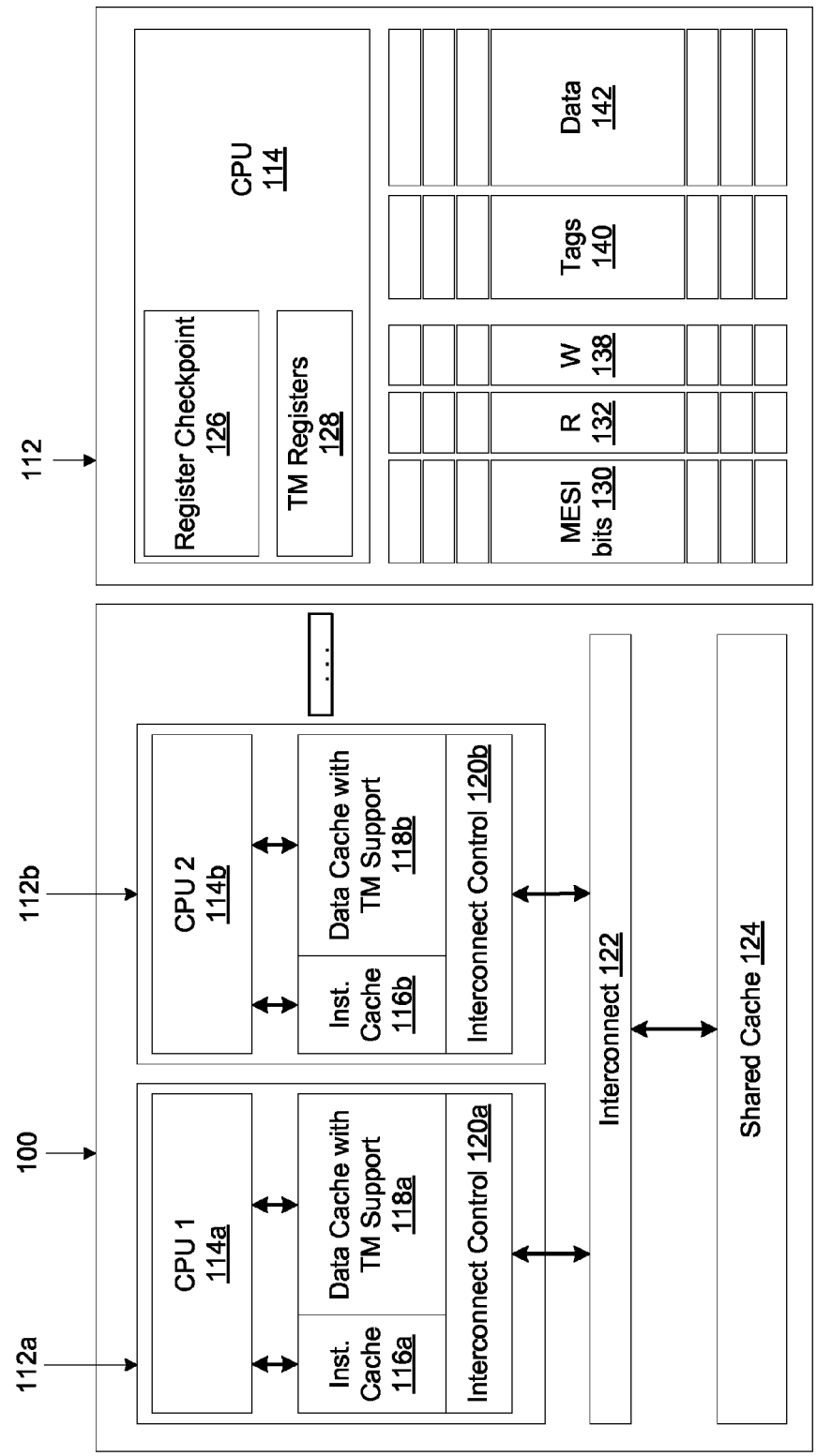

ENHANCING RELIABILITY OF TRANSACTION EXECUTION BY USING TRANSACTION DIGESTS

BACKGROUND

This disclosure relates generally to transactional memory systems and more specifically to a method, computer program and computer system for ensuring reliable execution of transactions by using digests.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (TM) have been introduced, wherein a group of instructions, called a transaction, operate atomically and in isolation (sometimes called "serializability") on a data structure in memory. The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

Publication by Song et al. titled "Error Detection by Redundant Transaction in Transactional Memory System" published in the Sixth IEEE International Conference on Networking, Architecture, and Storage (NAS), July 2011 by the IEEE Computer Society and incorporated by reference herein teaches the issue of error detection in transactional memory, and proposes a new method of error detection based on redundant transaction (EDRT). This method creates a transaction copy for every transaction, and executes both original transactions and transaction copies on adequate processor cores, and achieves error detection by comparing the execution results. EDRT utilizes the data-versioning mechanism of transactional memory to achieve the acquisition of an approximate minimum error detection comparing data set, and the acquisition is transparent and online. At last, this paper validates the EDRT through 5 test programs, including 4 SPLASH-2 benchmarks. The experimental results show that, the average error detecting cost is about 3.68% relative to the whole program, and it's only about 12.07% relative to the transaction parts of the program.

U.S. Pat. No. 8,281,185 titled "Advice-Based Feedback For Transactional Execution" filed 2009 Jun. 30 and incorporated by reference herein teaches a system that facilitates the execution of a transaction for a program in a hardware-supported transactional memory system. During operation, the system records a failure state of the transaction during execution of the transaction using hardware transactional memory mechanisms. Next, the system detects a transaction failure associated with the transaction. Finally, the system provides an advice state associated with the recorded failure state to the program to facilitate a response to the transaction failure by the program.

SUMMARY

According to an embodiment of the disclosure, a method for performing a transaction in a transactional memory environment for performing transactional executions, the memory store data of the transaction may be committed to memory at transaction completion, the transactional memory environment including a digest-generating transaction to generate a computed digest and a digest-checking transaction to compare computed digests may be provided. The method may include identifying, by a computer system, a first indicator signaling a beginning instruction of a digest-generating transaction including a first plurality of instructions. The digest-generating transaction may suppress committing memory store data of the digest-generating transaction to memory. The method may additionally include generating, by the computer system, a first computed digest based on the execution of at least one of the first plurality of instructions and identifying, by the computer system, a second indicator associated with the first plurality of instructions signaling an ending instruction of the digest-generating transaction including the first plurality of instructions. The first computed digest is replicable for an error-free execution of the first plurality of instructions. The method may additionally save, by the computer system, the first computed digest, as a reliability digest, based on completing the digest-generating transaction and not save the first computed digest based on an abort of the digest-generating transaction.

In another embodiment of the disclosure, a computer program product for performing a transaction in a transactional memory environment for performing transactional executions, the memory store data of the transaction may be committed to memory at transaction completion, the transactional memory environment may include a digest-generating transaction to generate a computed digest and a digest-checking transaction to compare computed digests, the computer program product may be provided. The computer program product may include a computer readable storage medium readable by a processing circuit and storing instructions for execution by the processing circuit for performing a method including: identifying, by a computer system, a first indicator signaling a beginning instruction of a digest-generating transaction including a first plurality of instructions. The digest-generating transaction may suppress committing memory store data of the digest-generating transaction to memory. The method may additionally include generating, by the computer system, a first computed digest based on the execution of at least one of the first plurality of instructions and identifying, by the computer system, a second indicator associated with the first plurality of instructions signaling an ending instruction of the digest-generating transaction including the first plurality of instructions. The first computed digest is replicable for an error-free execution of the first plurality of instructions. The method may additionally save, by the computer system, the first computed digest, as a reliability digest, based on completing the digest-generating transaction and not save the first computed digest based on an abort of the digest-generating transaction.

In another embodiment of the disclosure, a computer system for performing a transaction in a transactional memory environment for performing transactional executions, the memory store data of the transaction may be committed to memory at transaction completion, the transactional memory environment may include a digest-generating transaction to generate a computed digest and a digest-checking transaction to compare computed digests, the computer system may be provided. The computer system may include: a memory and a processor in communication with the memory, wherein the computer system is configured to perform a method, said method including: identifying, by a computer system, a first indicator signaling a beginning instruction of a digest-generating transaction including a first plurality of instructions. The digest-generating transaction may suppress committing memory store data of the digest-generating transaction to memory. The method may additionally include generating, by the computer system, a first computed digest based on the execution of at least one of the first plurality of instructions and identifying, by the computer system, a second indicator associated with the first plurality of instructions signaling an ending instruction of the digest-generating transaction including the first plurality of instructions. The first computed digest is replicable for an error-free execution of the first plurality of instructions. The method may additionally save, by the computer system, the first computed digest, as a reliability digest, based on completing the digest-generating transaction and not save the first computed digest based on an abort of the digest-generating transaction.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1 depicts an example multicore Transactional Memory environment, in accordance with an illustrative embodiment;

FIG. 2 depicts en example multicore Transactional memory environment, in accordance with an illustrative embodiment;

DETAILED DESCRIPTION

Figure 3:
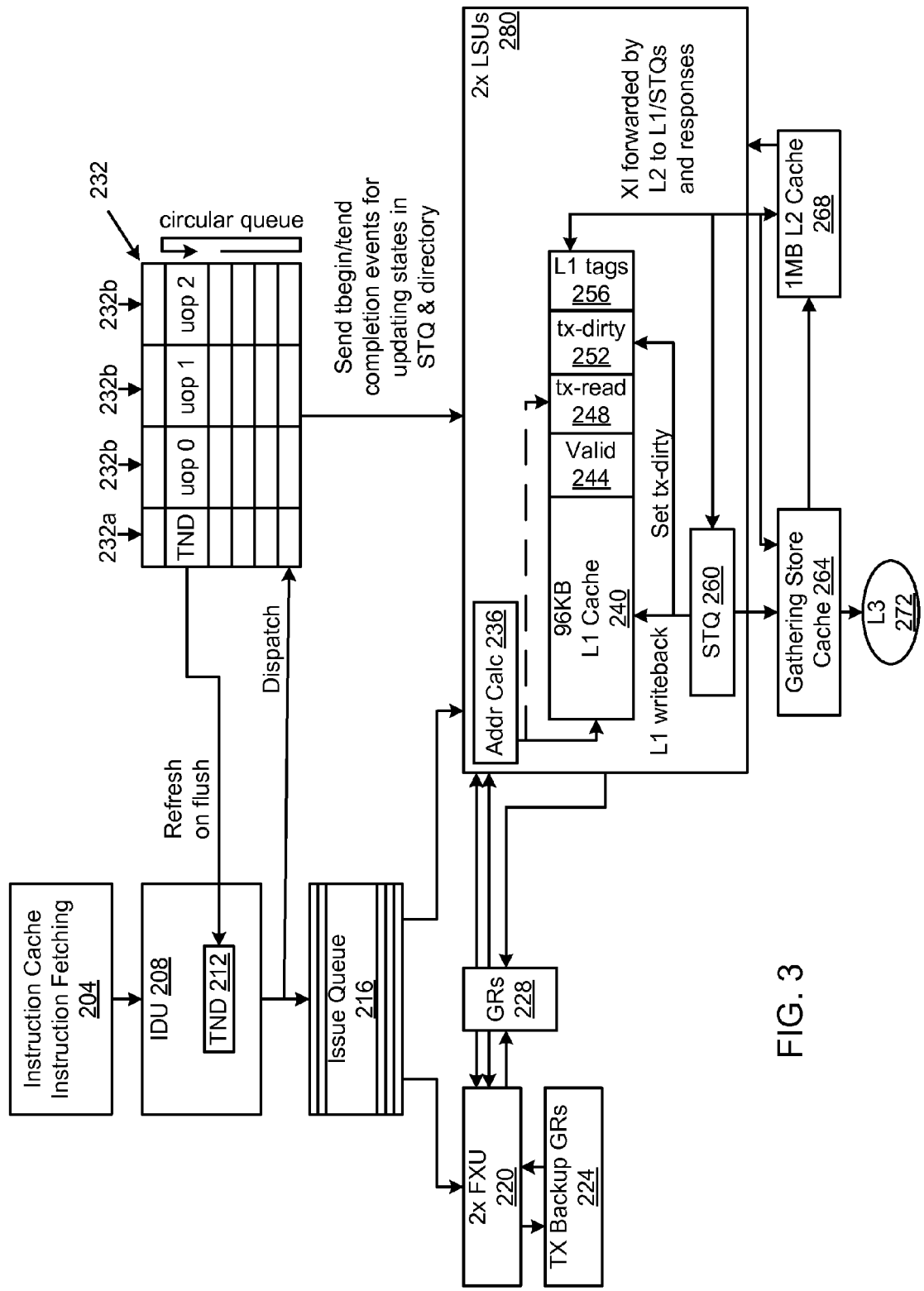
FIG. 3 depicts example components of an example CPU, in accordance with an illustrative embodiment.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write-set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:
XABORT
CPUID
PAUSE In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers:

MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.
Interrupts: INTn, INTO.
IO: IN, INS, REP INS, OUT, OUTS, REP OUTS and their variants.
VMX: VMPTRLD, VMPTRST, VMCLEAR, VMREAD, VMWRITE, VMCALL, VMLAUNCH, VMRESUME, VMXOFF, VMXON, INVEPT, and INVVPID.
SMX: GETSEC.
UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIGS. 1 and 2 depict an example of a multicore TM environment. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 116b for caching instructions from memory to be executed and a Data Cache 118a, 118b with TM support for caching data (operands) of memory locations to be operated on by CPU 114a, 114b (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a writebuffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are Log TM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (Log TM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

|   | LHI | R0,0 | *initialize retry count=0 |
|---|---|---|---|
| loop | TBEGIN | | *begin transaction |
|   | JNZ | abort | *go to abort code if CC1=0 |
|   | LT | R1, lock | *load and test the fallback lock |
|   | JNZ | lckbzy | *branch if lock busy |
|   | ... perform operation ... | | |
|   | TEND | | *end transaction |
|   | ... ... | ... ... | |
| lckbzy | TABORT | | *abort if lock busy; this |
|   | | | *resumes after TBEGIN |
| abort | JO | fallback | *no retry if CC=3 |
|   | AHI | R0, 1 | *increment retry count |
|   | CIJNL | R0,6, fallback | *give up after 6 attempts |
|   | PPA | R0, TX | *random delay based on retry count |
|   | ... potentially wait for lock to become free ... | | |
|   | J | loop | *jump back to retry fallback |
|   | OBTAIN | lock | *using Compare&Swap |
|   | ... perform operation ... | | |
|   | RELEASE | lock | |
|   | ... ... | ... ... | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 (FIG. 2) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| TBEGINC | | *begin constrained transaction |
|---|---|---|
| | ... perform operation ... | |
| TEND | | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232*b*) are written into a unified issue queue 216, from where they can be issued out-of-order. Up to two fixed-point, one floating-point, two load/store, and two branch instructions can execute every cycle. A Global Completion Table (GCT) 232 holds every micro-op 232*b* and a transaction nesting depth (TND) 232*a*. The GCT 232 is written in-order at decode time, tracks the execution status of each micro-op 232*b*, and completes instructions when all micro-ops 232*b* of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop 2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Transactional memory systems may ease multi-threaded programming by guaranteeing that some dynamic code sequences (hereafter "transactions"), execute atomically and in isolation. Transactional execution addresses the need for scalable synchronization in computer software applications as more CPUs are used by those applications. The computer software applications may additionally need to address the detection and handling of transient erroneous execution failures (hereinafter "transient failures"), an issue critical to correct execution. Transient failures may, for example, change logic values in a circuit due to the presence of charged particles in the environment and it may be critical for computer software applications to identify when this has occurred. Typically, mechanisms that detect and address transient failures may be expensive in terms of at least one of complexity, design resources, and testing.

Thus, in computer software applications, especially critical applications, it may be desirable to use design capabilities for transactional execution supporting correct execution to additionally know that the transaction executed correctly with respect to the occurrence of transient failures, i.e., those failures due to transient state changes induced, for example by charged particles. Successfully COMMITted transactions, while they may signal no ABORT conditions occurred for the transaction, may not indicate the transaction was free from transient failures. As more and more functionality is stored on a hardware chip, the likelihood of a radiation induced transient failure increases. Transient failures may cause the data manipulated within the transaction to be corrupted. Recognizing and handling transient failures allows computer software applications to be more resilient.

Reliable computing ensures correct execution, free of transient errors. Typically, correct execution in conjunction with transactional execution has required multiple executions of a transaction to run in parallel and in lockstep, as well as dedicated hardware to perform cycle-by-cycle comparison of parallel execution results in order to detect transient failures. Cycle-by-cycle comparisons may require a reference transaction and a compare transaction to run simultaneously. The cycles on the systems on which the reference transaction and compare transaction run must behave similarly and the computer system which runs the reference transaction must have the ability to suppress state changes in the reference transaction. Transactional execution results comparison may require the storing of large amounts of comparison data.

In embodiments of the disclosure, transient failures may be detected by executing the same transaction multiple times, either on the same processor 114 (FIG. 16) consecutively or on multiple processors 114 (FIG. 16) in parallel, without cycle-by-cycle comparisons and without comparisons of large amounts of execution results. In an embodiment of the disclosure, this is achieved by generating and comparing a transactional execution digest (hereinafter "digest"). The digest may be a data structure representing a summarization of an unbounded number of elements in a bounded representation. A robust digest may be generated using invariant data within the transaction and using an algorithm including, but not limited to, a HASH of the data values, a checksum, and an error-correcting code technique where differing data would generate differing digests. The digest may be a fixed length or a variable length and may summarize an entire transactional execution or a subset of the transactional execution. The digest generated by a transaction will be exactly replicable for each error-free execution of the transaction. Embodiments may utilize any number of "digest computing algorithms" that are either currently known or may be invented in the future.

A "computed digest" may be the digest generated and updated within a transactional region, prior to saving the digest to a permanent location. The computed digest may reside, for example, in a store buffer, a cache, or a software array. Once saved, the computed digest may be used as a reference digest (hereinafter "reliability digest") against which the processor 114 (FIG. 16) may compare to determine whether a transaction executed correctly. The reliability digest may be saved to a location including, but not limited to, a transaction control structure, a processor defined location, a defined register, a control register, a special purpose register, a memory location not used by a computer software application or a memory location supplied by the computer software application.

A "reliability-digest-generating transaction" may generate a computed digest that may be saved as the reliability digest. A "reliability-digest-checking transaction" may generate a computed digest that may be compared with the reliability digest. It should be noted, the reliability-digest-generating transaction and the reliability-digest-checking transaction should each use the same invariant data within the transaction and the same algorithm to generate the digests in order to yield equivalent digests.

In reliable computing using a digest, not all successful transactions COMMIT their results, and even a non-COMMITting version of a transaction may need to maintain a transactional write-set for the duration of the transaction. The transactional write-set may allow the non-COMMITting transaction to generate a digest equivalent to a COMMITting version of the same transaction, when both transactions execute error-free. The location in which the transactional write-set may reside includes, but is not limited to, a store buffer, a cache, and a software array.

Because the computed digest and the reliability digest should be equivalent for all error-free executions of a transaction, the processor 114 (FIG. 16) or a computer software application may compare reliability digests to one another or to a computed digest in order to detect and recover from transient failures and single event failures. Comparing digests may also allow the processor 114 (FIG. 16) or computer software application to detect and recover from permanent execution failures including, but not limited to, failures in a single execution unit and manufacturing defects in a single execution unit where there may be alternate execution units on which to execute. An execution unit may include, but is not limited to, a core, a thread, and a processor. Thus, when one execution of a transaction uses an execution unit exhibiting a permanent execution failure, and another execution of the transaction uses an execution unit not exhibiting the same permanent execution failure, a digest mismatch may occur. The digest mismatch may indicate an error condition during execution. In at least one embodiment of the disclosure, a hardware or software scheduling component including, but not limited to an instruction scheduler and a thread scheduler, may aim to increase the likelihood of executing on different hardware components to the extent practical subject to other system constraints including, but not limited to, performance, power, scheduling classes, partitioning, gang scheduling and user-provided scheduling instructions. Executing on different hardware components may ensure multi-execution using a different set of execution units in order to detect permanent execution failures.

The processor 114 (FIG. 16) may utilize the computed digests and the reliability digests to determine if a transaction executed correctly. The processor 114 (FIG. 16) may make the determination either within a single execution of the transaction or across multiple executions, without depending on cycle-by-cycle comparisons, simultaneous execution or special abilities of the underlying systems. The processor 114 (FIG. 16) may also utilize the computed digest to roll back the transaction and undo any changes when the transaction executes incorrectly. Transactions, hereinafter "reliable-execution transactions", may both generate and compare digests to ensure the transaction executed correctly.

A computer software application may run critical segments of code as a reliable-execution transaction. Upon successful completion of the transaction, the computer software application may reliably utilize any calculations or other tasks accomplished in the transaction. An unsuccessful return from the reliable-execution transaction may be caused, for example, by an ABORT due to conflicts, lack of buffer space or any of the traditional reasons for an ABORT, or may be caused by an execution error due, for example, to a transient failure or a permanent error on a hardware execution unit. The computer software application may respond to a failure by, for example, retrying the transaction, retrying the transaction on a different execution unit or running alternate code depending on the failure and the needs of the application.

The computer system 1600 (FIG. 16) may be configured such that reliable-execution transactions may run and error conditions may be resolved without computer software application modification. The computer system 1600 (FIG. 16) may, additionally, be configured to recognize and automatically remove continually failing execution units that may be recognized during a reliable-execution transaction. For those computer software applications that may receive these errors, the computer software application may contain alternate code to handle an ABORT condition, for example, by breaking the transaction into smaller execution sections, running the transaction unprotected or obtaining a software lock. The computer software application may additionally contain code to handle a permanent execution unit failure, for example, by running the transaction on an alternate core or thread (hereinafter "processor"). A computer software application may be required to save and restore registers around a reliable-execution transaction and may need to be aware of any registers used by the reliable-execution transaction to contain or address the reliability digest and any return data.

Figure 4:
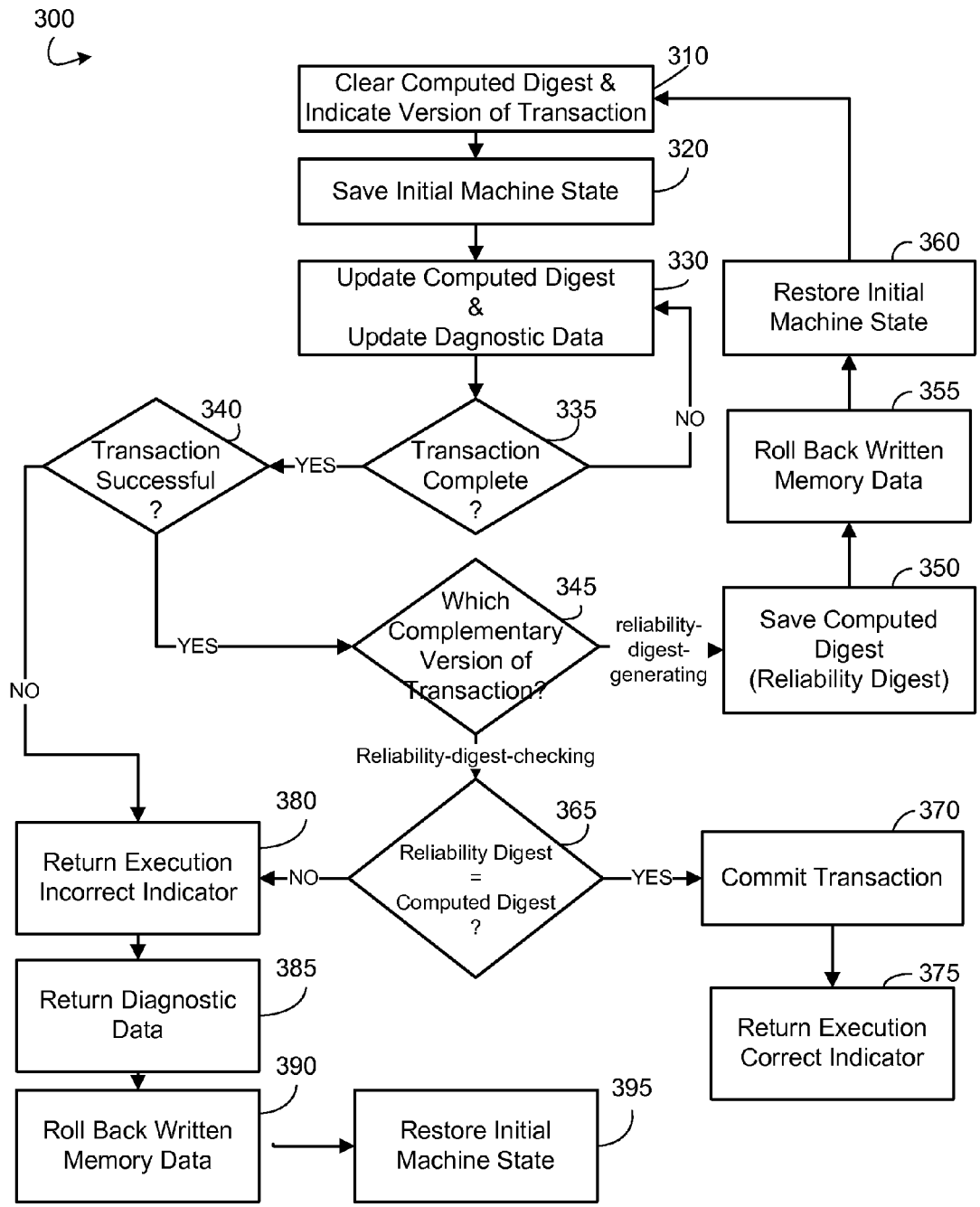
FIG. 4 is a flowchart illustrating steps performed by a processor for ensuring the correct execution of a transaction during a reliable-execution transactional execution, illustrated within the data processing environment of FIG. 16, in accordance with an embodiment of the disclosure.
Figure 15:
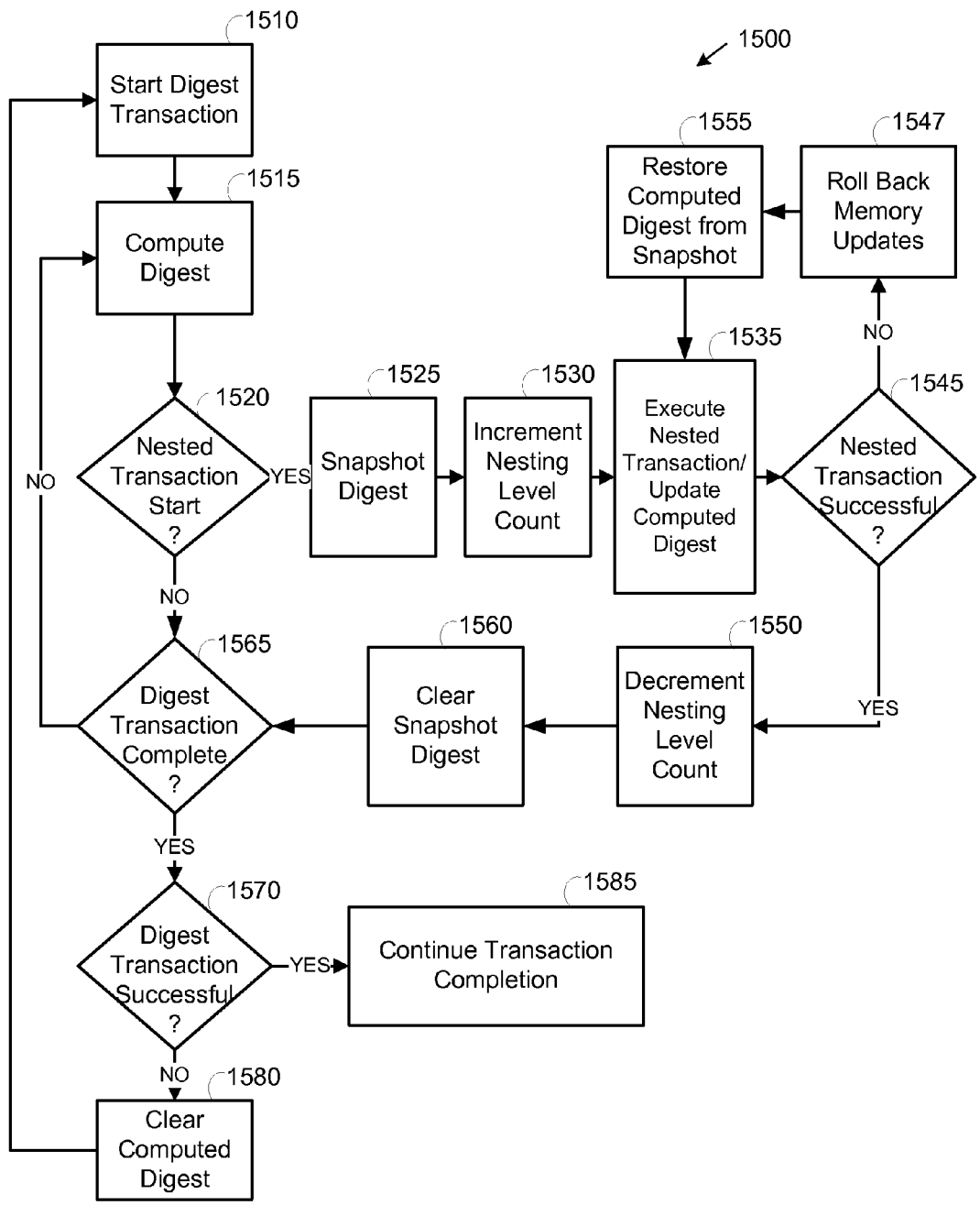
FIG. 15 is a flowchart illustrating steps performed by a processor for generating a digest for transactions that include transactional nesting, illustrated within the data processing environment of FIG. 16, in accordance with an embodiment of the disclosure.
Figure 16:
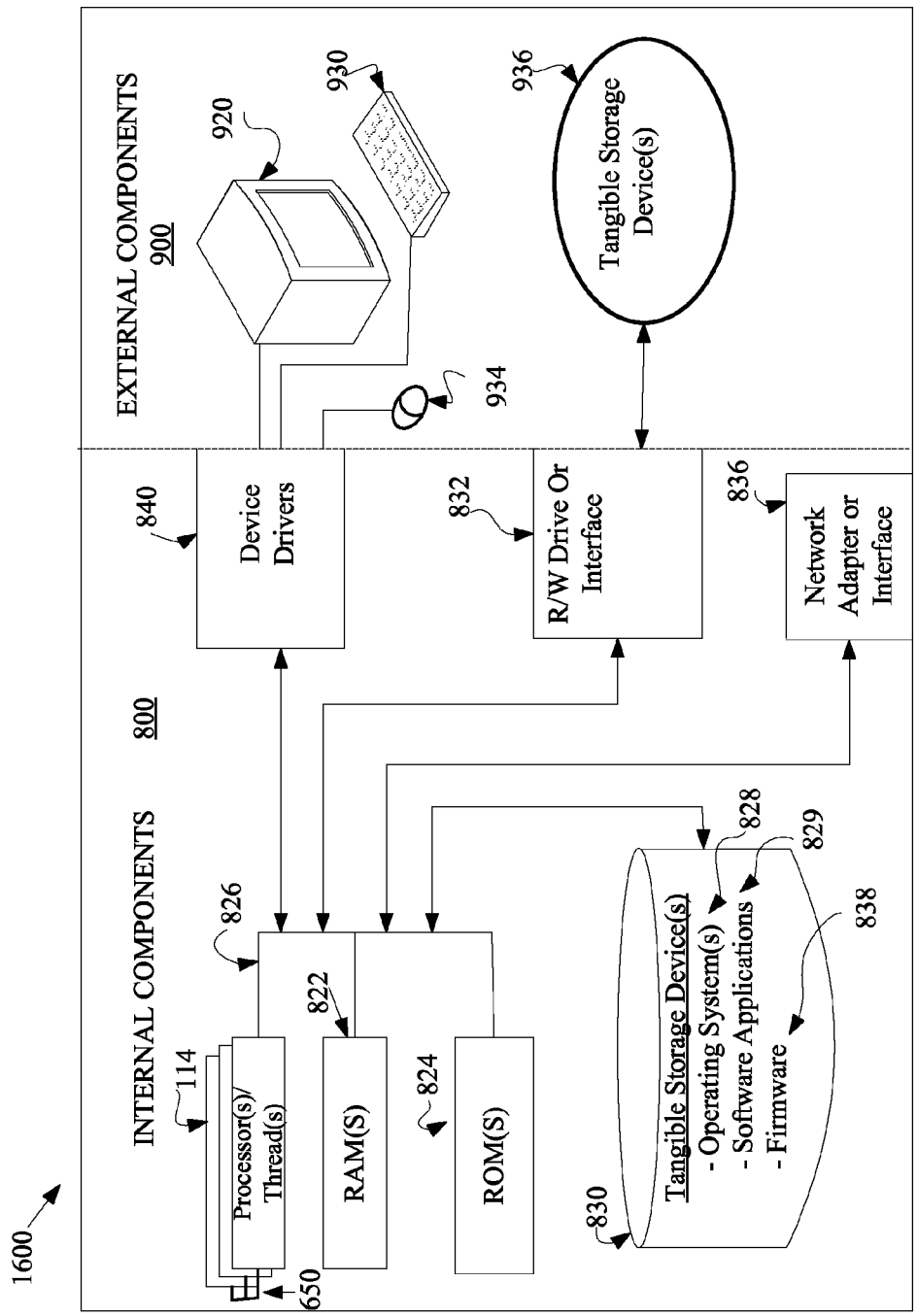
FIG. 16 is a schematic block diagram which illustrates internal and external components of a server computer in accordance with an illustrative embodiment.

Now referring to FIG. 4, flowchart 300 illustrates steps performed by the processor 114 (FIG. 16) for ensuring the correct execution of a transaction during a reliable-execution transaction, within the data processing environment of FIG. 16. The steps of the flowchart 300 illustrate an embodiment of the disclosure in which the reliable-execution transaction may be run twice, in sequence, once as a reliability-digest-generating version of the transaction followed by a reliability-digest-checking version of the same transaction. The processor 114 (FIG. 16) may identify a reliable-execution transaction by a reliable-execution transaction begin instruction, discussed in detail below, with reference to FIGS. 8, 10 and 12, or may automatically run the transaction as a reliable-execution transaction in a system configured to run reliable transactions. The processor 114 (FIG. 16), at 310, may clear the computed digest in preparation for the reliable-execution transaction, and indicate which version of the transaction is executing. The first executed transaction may be the reliability-digest-generating transaction; the second executed transaction may be the reliability-digest-checking transaction. The processor 114 (FIG. 16) may save the initial machine state, at 320. For each instruction in the reliable-execution transactional region, the processor 114 (FIG. 16) may, at 330, update the computed digest and update the diagnostic data. The processor 114 (FIG. 16) may iterate, at 335, through each instruction in the reliable-execution transaction updating the computed digest, as necessary, until the processor 114 (FIG. 16) identifies a reliable-execution transaction end instruction, discussed in detail below, with reference to FIGS. 9, 11 and 13, or identifies a traditional transaction end instruction for a processor 114 (FIG. 16) configured to automatically run reliable transactions. If the processor 114 (FIG. 16) encounters a transaction suspend during transactional execution, the updating of the computed digest may be suspended as well. If the processor 114 (FIG. 16) encounters a transaction failure in a nested transaction, the processor 114 (FIG. 16) may roll back the computed digest to reflect the computed digest as it was just prior to the start of the nested transaction. In another embodiment, where flattened nesting is implemented, when a nested transaction fails, rollback occurs to the outermost transaction, and the computed digest is cleared. Nested transaction will be discussed in more detail below with reference to FIG. 15.

The processor 114 (FIG. 16), at 340, may determine if the transaction completed successfully. For an unsuccessful completion (ABORT) of either the reliability-digest-generating version of the transaction or the reliability-digest-checking version of the transaction, at 340, the processor 114 (FIG. 16) may set a return value, at 380, to indicate to the computer software application that the transaction may have incorrectly executed due to the transaction ABORT. The return value may be stored to the location passed (either explicitly or implicitly) as input to the reliable-execution transaction or to the location defined by the computer system 1600 (FIG. 16) configured to automatically run transactions reliably. The processor 114 (FIG. 16) may provide diagnostic data, at 385, including but not limited to, the computed digest, information detailing reasons the transaction aborted and the address that caused the abort, as well as the return value to the computer software application. Reasons a transaction aborts include, but are not limited to, interference from another transaction, interference from another memory operation, and running out of resources. The processor 114 (FIG. 16) may roll back any written memory data, at 390, and may also restore the initial machine state, at 395. In an embodiment in which the reliable-execution transaction is a constrained transaction, the processor 114 (FIG. 16) may restart the transaction automatically.

For a successful (non-ABORT) completion of the reliable-execution transaction, at 340, the processor 114 (FIG. 16) may determine, at 345, which version of the transaction completed successfully (non-ABORT). For a successfully completed reliability-digest-generating version of the transaction, the processor 114 (FIG. 16) may, at 350, save the computed digest. The saved computed digest is the reliability digest. The reliability digest may be used as the reference digest a reliability-digest-checking version of the transaction compares its computed digest with to determine a successful execution (non-transient failure) of the transaction. The reliability digest may be saved to the location passed (either explicitly or implicitly) as input to the reliable-execution transaction or to the location defined by the computer system 1600 (FIG. 16) configured to automatically run reliable transactions. The reliability-digest-generating version of the transaction may not COMMIT any computational results, but may only save the reliability digest. Preferably, this embodiment may be used in conjunction with a reliability-digest-checking version of the transaction which may compare its computed digest with the provided reliability digest, and may COMMIT the results when the digests match.

In another embodiment of the disclosure, the reliability-digest-generating version of the transaction may not COMMIT any memory write results of the transaction and may save the reliability digest but may additionally modify the register state. Preferably, this embodiment may be used in conjunction with a reliability-digest-checking version of the transaction which may compare its computed digest with the provided reliability digest, and may COMMIT the results when the digests match. In this embodiment, it may be the responsibility of the computer software application executing on the processor 114 (FIG. 16) to capture and restore any register state that needs to be preserved across the reliable-execution transaction.

In another embodiment of the disclosure, the reliability-digest-generating transaction my COMMIT the results of the transaction in addition to saving a reliability digest.

Before re-executing the transaction as a reliability-digest-checking version of the transaction, the processor 114 (FIG. 16) may, at 355, roll back any memory data written by the reliability-digest-generating version of the transaction and may, at 360, restore the initial state of the machine with the exception of any register that may contain or point to the saved reliability digest. The reliability-digest-checking version of the transaction must execute under the same machine state and data environment as the reliability-digest-generating version and the computed digest updates must exactly mirror the updates made by the reliability-digest-generating version of the transaction in order to generate a digest that will yield an accurate indication whether the reliable-execution transaction executed correctly.

For a successfully completed (non-ABORT) reliability-digest-checking version of the transaction, determined at 345, the processor 114 (FIG. 16) may obtain the reliability digest saved by the reliability-digest-generating version of the transaction. The reliability digest may be obtained from the location passed (either explicitly or implicitly) as input to the reliable-execution transaction or from the location defined by the computer system 1600 (FIG. 16) configured to automatically run reliable transactions. To determine if the transaction executed correctly, the processor 114 (FIG. 16) may, at 365, compare the computed digest with the obtained reliability digest. Equivalence between the computed digest and the reliability digest may indicate a successfully executed transaction. The processor 114 (FIG. 16) may COMMIT the transaction, at 370, for a successfully executed transaction and may set a return value, at 375, to indicate to the computer software application that the reliable-execution transaction completed successfully and correctly. The return value may be stored to the location passed (either explicitly or implicitly) as input to the reliable-execution transaction or to the location defined by the computer system 1600 (FIG. 16) configured to automatically run transactions reliably. Differences between the computed digest and the reliability digest, at 365, may indicate an error during transactional execution. The processor 114 (FIG. 16) may set a return value, at 380, to indicate to the computer software application that the transaction encountered an execution error during transactional execution. An execution error condition may appear similar to an ABORT condition to the computer software application. Both may roll-back the written data and return indications of failure, but the computer software application's response may differ. A computer software application may chose to execute alternate code for an ABORT return value due to interference from another transaction, but may choose to re-execute the transaction on the same or an alternate processor for an execution error return value indicating a possible transient failure or permanent hardware failure. In an alternate embodiment, the computer software application may choose to simply restart the transaction with an expectation that a transient failure may not recur. The return value may be stored to the location passed (either explicitly or implicitly) as input to the reliable-execution transaction or to the location defined by the computer system 1600 (FIG. 16) configured to automatically run reliable transactions. The processor 114 (FIG. 16) may additionally, at 385, return diagnostic data to the computer software application including, but not limited to, the computed digest, information detailing reasons the execution failed, information detailing reasons the transaction ABORTed, the address that caused the ABORT, the instruction that caused the execution failure, a list of transactional execution memory updates, a list of transactional execution memory addresses and a list of transactional execution instructions that were included in the computed digest. The processor 114 (FIG. 16) may roll back any written memory data, at 390, and restore the initial machine state, at 395. In an embodiment in which the reliable-execution transaction is a constrained transaction, the processor 114 (FIG. 16) may restart the transaction automatically.

It should be noted that a digest mis-compare may be due to a number of causes, including, but not limited to, a change of data accessed by the transaction between a first execution as a reliability-digest-generating transaction and a re-execution as a reliability-digest-checking transaction, a transient failure in at least one of the first or second such transactions, and execution of one or more instructions of either execution of the transaction on a permanently faulty execution unit, when the corresponding instruction of the other transaction is executed on an alternate, non-permanently faulty unit.

In one embodiment of the disclosure, a scheduling component including, but not limited to, an instruction, thread, process, partition and virtual machine scheduler, may attempt to increase the likelihood of detecting permanently faulty units. The scheduling component may, for example, ensure that corresponding instructions of the reliability-digest-generating transaction and the reliability-digest-checking transaction execute on different execution units. Alternately, the scheduling component may increase the likelihood that the complementary transactions will be executed on different execution units by, for example, randomizing an assignment of instructions to execution units, threads, or processors. It should be noted that not all permanent failures may be detected. Exemplary permanent failures that my not be detected include, but are not limited to, corresponding instructions of the complementary transactions being executed on the same faulty unit and a same permanent failure exhibits simultaneously on multiple execution units.

In another embodiment, an execution error may cause the processor 114 (FIG. 16) to restart the reliable-execution transaction in hopes of a correct execution when restarted. For a transient failure, restarting the transaction may result in a successful execution. The processor 114 (FIG. 16) may continue to restart the failed reliable-execution transaction until a threshold number of unsuccessful attempts have been made before returning an error result to the computer software application.

In embodiments, the method 300 of FIG. 4 may be implemented in software, hardware or a hybrid of hardware and software.

In one embodiment, a software transactional memory (STM) system may perform the steps of method 300 in software. In one optimized embodiment, there may be hardware support for computing digests while other transactional memory steps are performed in software or a hybrid of hardware and software in accordance with an STM implementation. Hardware support for computing digests may include, but is not limited to, explicit digest instructions for indicated instructions (e.g., all or a subset of memory instructions), explicit digest instructions for a statically defined subset of all instructions (e.g., all memory instructions) and digest computing optionally subject to a mode enabling and disabling digest generation, In another embodiment, all, or substantially all, of flowchart 300 may be implemented directly in hardware. In one hardware embodiment, reliable-transaction boundaries may be indicated and hardware may execute such transactions twice, once as a reliability-digest-generating transaction and a second time as a reliability-digest-checking transaction. Restart for a reliability-digest-generating transactional execution and a reliability-digest-checking transactional execution may be performed automatically in hardware. In at least one embodiment, the hardware may additionally implement retry policies when a mis-compare of the digests may be encountered. In one optimized embodiment, retry policies may be responsive to user parameters, including, but not limited to, execution retry counts for a mis-compare of the digests.

In a hybrid hardware software embodiment, hardware support for reliability-digest-generating, reliability-digest-checking, and reliable-execution transactions may be provided. In one hybrid embodiment, the hardware support for the reliability-digest-generating, reliability-digest-checking, and reliable-execution transactions may include, but is not limited to, instructions to initiate transactions for reliability-digest-generation, reliability-digest-checking, and reliable-execution, respectively, as discussed below with reference to FIGS. 8-13. This hybrid embodiment may control flow and policy decisions in software. The software may, for example, control one or more aspects of executing transactional code for reliability-digest-generation and reliability-digest-checking and may, for example, control policy decisions about whether to restart a transaction when a mis-compare of the digests may be detected.

In at least one embodiment, a reliability-digest-generating transaction and a corresponding reliability-digest-checking transaction may execute in parallel to accelerate execution time. Advantageously, embodiments do not require parallel reliability-digest-generating transactions and corresponding reliability-digest-checking transactions to run in lockstep, or on specific cores reflecting a presence of lockstep verification hardware.

Figure 5:
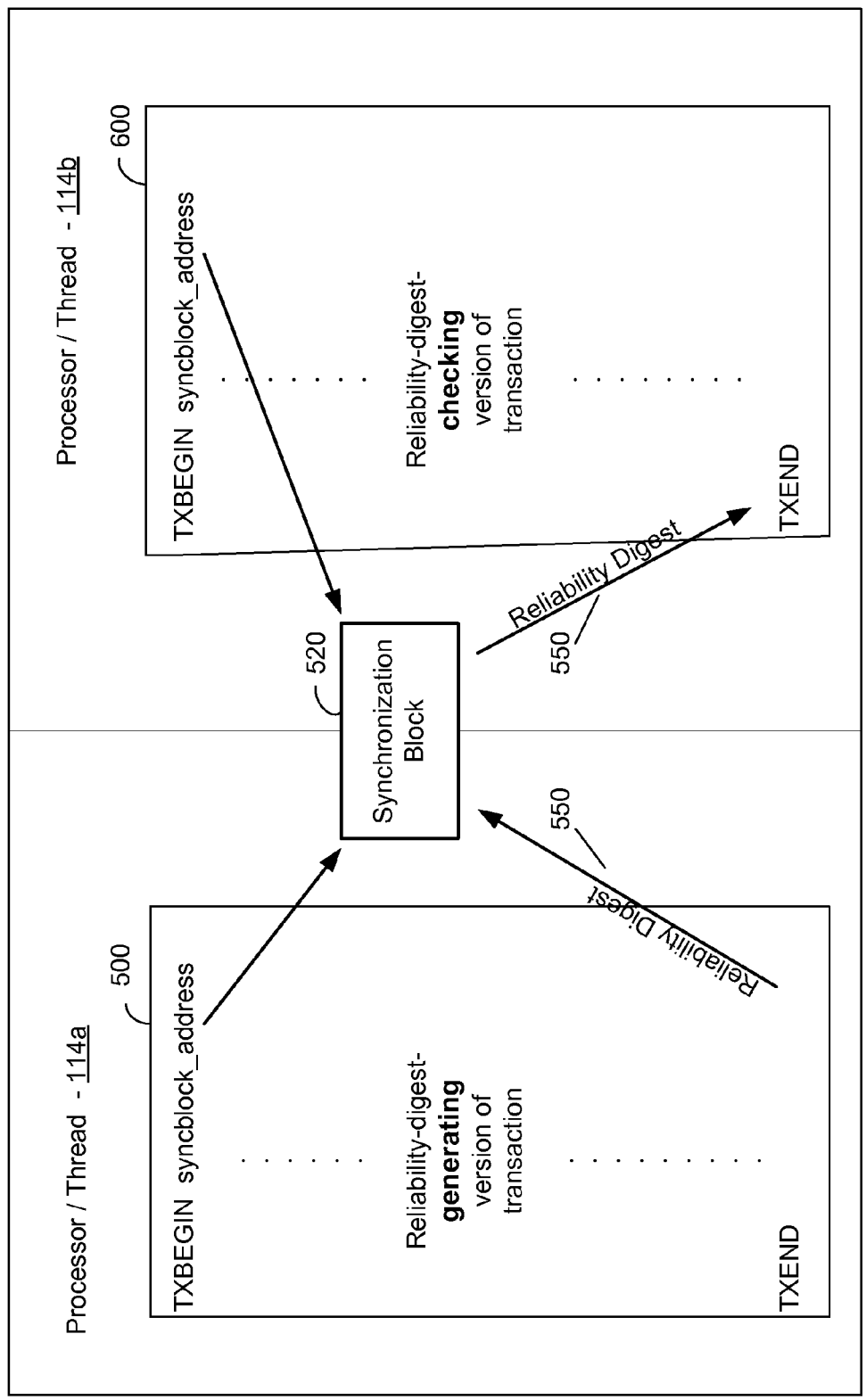
FIG. 5 is a schematic block diagram illustrating parallel execution of the reliable-execution transaction within the data processing environment of FIG. 16, in accordance with an embodiment of the disclosure.
Figure 6:
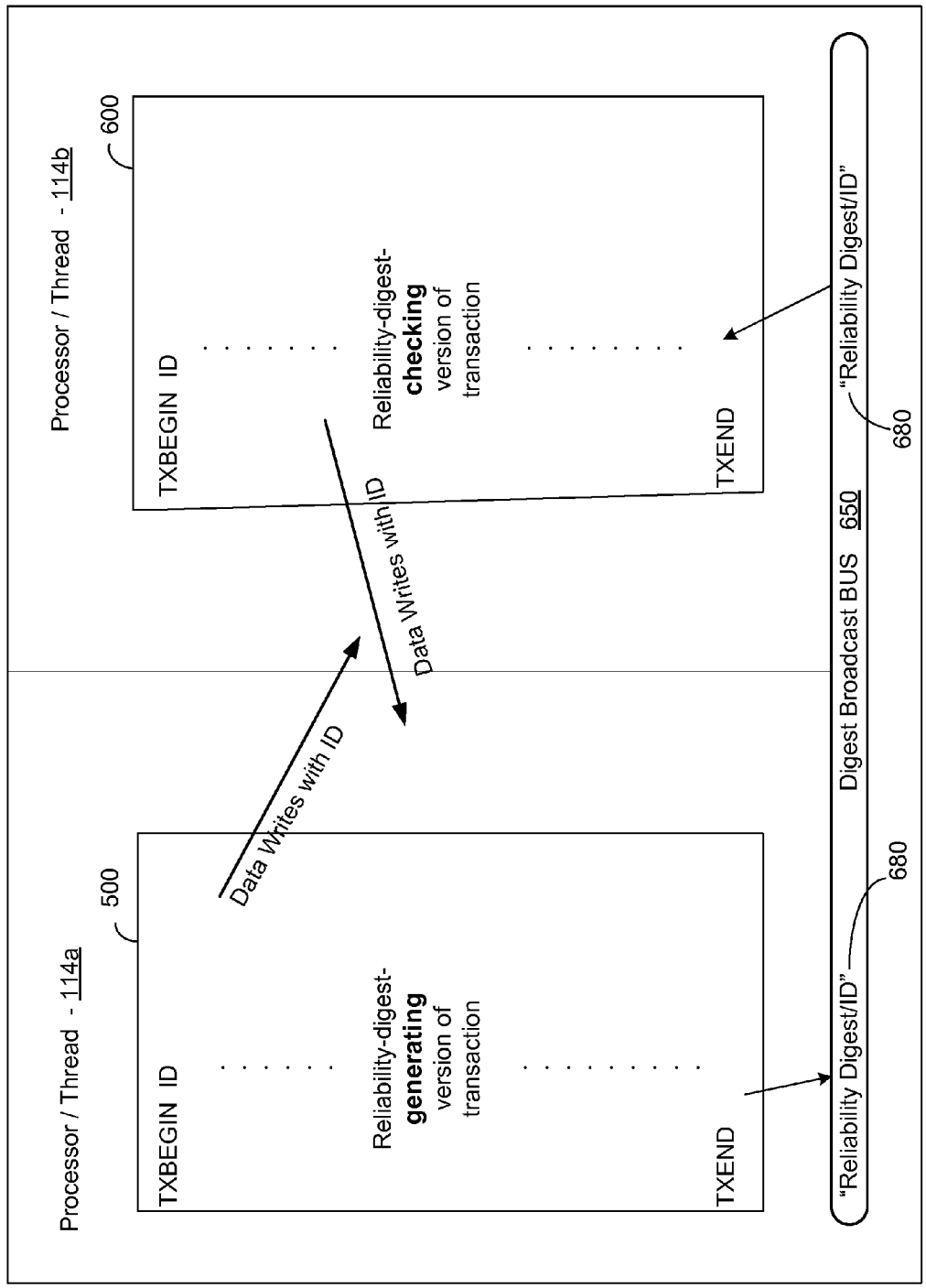
FIG. 6 is a schematic block diagram illustrating parallel execution of the reliable-execution transaction within the data processing environment of FIG. 16, in accordance with an embodiment of the disclosure.

Referring now to FIG. 5 and FIG. 6, schematic block diagrams illustrating embodiments in which the versions of the reliable-execution transaction 500 and 600 run in parallel, on different processors 114a, 114b (FIG. 1), within the data processing environment of FIG. 16. In an embodiment of the disclosure, one processor 114a (FIG. 1) may execute the reliability-digest-generating version 500 of the transaction, another, the reliability-digest-checking version 600 of the same transaction. Each complimentary version of the reliable-execution transaction may begin with the same initial transaction state, and each may execute with their own transaction write-set of uncommitted data updates in order to generate equivalent digests using identical data. In a computer system 1600 (FIG. 16) configured to run reliable transactions, the computer system 1600 (FIG. 16) may establish an environment where data conflicts between the two complimentary versions of the reliable-execution transaction running simultaneously may be ignored. Ignoring conflicts between complimentary versions of the reliable-execution transactions may avoid the introduction of false conflicts that may arise from the reliability-digest-generating transaction and the reliability-digest-checking transaction operating on the same data. The reliability-digest-generating version 500 of the transaction may never COMMIT the data changes to memory so all data writes may appear as uncommitted data to its compliment. In an embodiment of the disclosure, a token may be sent with a data update and passed between processors 114a, 114b (FIG. 1) to identify the data update of the complementary versions 500 and 600 of the transaction. In another embodiment, the token sent with the data update for the reliability-digest-generating version 500 of the transaction may signal to all other transactions that the data may never be COMMITted to memory and may never cause a conflict.

When the reliable-execution transaction versions are run on multiple processors 114 (FIG. 16), the complimentary versions of the transaction may need to synchronize and communicate to verify the transaction executed correctly. Complementary versions 500 and 600 of the reliable-execution transaction running on different processors 114 (FIG. 16) may not have access to each others' registers, cache, or processor defined locations and may need alternate methods to pass the reliability digest. In addition, since instructions within the transactional region may execute in an order different than the order fetched and since the reliability-digest-checking version 600 of the reliable-execution transaction may reach its TXEND instruction before the reliability-digest-generating version 500 has saved the reliability digest, the complementary versions 500 and 600 may need to identify each other and synchronize their executions. The reliability-digest-generating version 500 of the transaction may not be considered complete until the transaction ABORTs or the reliability digest is saved. The reliability-digest-checking version 600 of the transaction may not be considered complete until the transaction COMMITs or ABORTs.

With continued reference to FIG. 5, illustrating an embodiment of the disclosure in which the complementary versions of the reliable-execution transaction 500 and 600 may run on different processors 114a, 114b (FIG. 1), and in which each may access a shared synchronization block 520. The shared synchronization block 520 may be initialized at the beginning of the reliable-execution transaction such that the two complementary versions 500 and 600 of the transaction may identify each other. The shared synchronization block 520 may additionally include the reliability digest 550 or an address of a location where the reliability digest 550 may be stored or obtained. Once the reliability-digest-generating version 500 of the reliable-execution transaction has saved the reliability digest 550, it may be available to the reliability-digest-checking version 600 of the reliable-execution transaction. The reliability-digest-checking version 600 may need to wait and re-sample the synchronization block 520 when an attempt to obtain the reliability digest 550 occurs before the reliability-digest-generating version 500 has saved it. Alternately, the computer system 1600 (FIG. 16) may be configured to notify the reliability-digest-checking version 600 when the reliability-digest-generating version 500 saves the reliability digest 550. The synchronization block 520 may include additional transaction information including, but not limited to, success indicators for each of the complementary versions 500 and 600 of the reliable-execution transaction, completion indicators and ID tokens for the transaction.

With continued reference to FIG. 6, illustrating an embodiment of the disclosure in which the complementary versions of the reliable-execution transaction 500 and 600 may run on different processors 114a, 114b (FIG. 1), and in which each may be identified by a shared ID, and in which each may communicate through a Digest Broadcast Bus 650. The Digest Broadcast Bus 650 may be a hardware bus accessible from each processor 114a, 114b (FIG. 1). The shared ID may be initialized at the beginning of the reliable-execution transaction such that the two complementary versions 500 and 600 of the transaction may identify each other. The ID may be hardware generated or software generated. Any data written by the complementary versions 500 and 600 of the reliable-execution transaction may be identified with the shared ID initialized at the beginning of the transaction. Data conflicts may be ignored for any data identified with a complimentary ID. Data conflicts with a different ID or data conflicts with no ID may cause the transaction to ABORT. Once a reliability-digest-generating version 500 of the reliable-execution transaction has completed, the generated reliability digest identified with the shared ID 680 may be broadcast across the Digest Broadcast Bus 650. As discussed above, with reference to FIG. 5, the reliability-digest-checking version 600 may need to wait for the reliability digest identified with the shared ID 680 to be saved and, in this embodiment, broadcast. The computer system 1600 (FIG. 16) may also be configured to notify the reliability-digest-checking version 600 when the reliability digest identified with the shared ID 680 has been broadcast. The Digest Broadcast Bus 650 may broadcast additional transaction information including, but not limited to, success indicators for each of the complimentary versions 500 and 600 of the reliable-execution transaction and completion indicators, each identified with the shared ID of the reliable-execution transaction.

In at least one embodiment of FIGS. 5 and 6, within the data processing environment of FIG. 16, the reliability-digest-generating transaction and the reliability-digest-checking transaction may be dynamically identified. In one embodiment, the first of the transactions 500, 600 to complete may become the reliability-digest-generating transaction by saving a digest and rolling back its memory state. The second transaction to complete may become the reliability-digest-checking transaction. Because the operations of the reliability-digest-generating and reliability-digest-checking transactions may be symmetric until step 345 (FIG. 4), the processor 114a, 114b (FIG. 1) may, with minimal incremental overhead, differentiate, at 345 (FIG. 4) to allow the first transaction to substantially de-allocate most of the resources associated with the transactional execution.

As discussed above, embodiments may utilize any number of "digest computing algorithms" that are either currently known or may be invented in the future.

In one embodiment of the disclosure, the processor 114 (FIG. 16) may HASH only written memory to update the computed digest. Speculative execution, common in many processors today, may affect the generation of the computed digest. Only updating the computed digest for memory write instructions may generate the computed digest with the least likelihood of requiring a roll back due to mis-speculation. Computer system 1600 (FIG. 16) may track write instructions more aggressively than other instruction types and speculatively written data may be invalidated by the computer system 1600 (FIG. 16) when mis-speculation occurs. Speculatively read data may not be tracked by computer system 1600 (FIG. 16), thereby requiring additional support to roll back speculatively read data from the computed digest. Two transactions with the same write set may have the same user-visible effect and may, therefore, generate identical digests.

Some processors 114 (FIG. 16) may only write the data to memory when the instruction has completed successfully. In this environment, the processor 114 (FIG. 16) may never need to roll back the updated computed digest. Other processors 114 (FIG. 16) may write the data speculatively to a store queue and back out any data from the store queue when an instruction error is detected. The processor 114 (FIG. 16) may then restart the instruction execution. In this environment, the processor 114 (FIG. 16) may need to roll back the memory write data from the computed digest as well.

In another embodiment of the disclosure, the processor 114 (FIG. 16) may HASH memory data read during the transaction, in addition to the written data. The created read HASH values may be used to update the computed digest. Updating the computed digest with the read values along with the written values may generate a more robust computed digest and more reliable computing. Speculative reads, if used to update the computed digest, may be non-replicable since multiple executions of the transaction may speculate the reads differently. The processor 114 (FIG. 16), in this embodiment, may need to ensure the computed digest reflects only the read data that corresponds exactly with the execution of the transaction and roll back any updates to the computed digest made for the speculative reads.

In another embodiment, the processor 114 (FIG. 16) may additionally update the computed digest with HASH values of General Purpose Registers (GPRs) updated during the execution of the transaction. It should be noted, this embodiment may also need to be aware of speculative GPR updates. Like speculative reads above, speculative GPR updates may cause the resulting computed digest to be non-replicable due to multiple executions of the transaction speculating differently. The processor 114 (FIG. 16), in this embodiment, may need to ensure the computed digest reflects only the data that corresponds exactly with the execution of the transaction and roll back any updates to the computed digest made for speculative GPR updates.

In one or more embodiments, the GPR set may additionally include, but is not limited to, floating point registers, vector registers, media registers, vector-scalar registers, condition registers, condition fields, predicate registers, special purpose registers, control registers, and machine-specific registers.

In another embodiment of the disclosure, the processor 114 (FIG. 16) may additionally update the computed digest with HASH values of data written to external memory and other storage locations including, but not limited to, on-chip registers. It should be noted, this embodiment may need to be aware that speculative branching, like speculative reads and GPR updates above, may cause the resulting digest to be non-replicable due to multiple executions of the transaction speculating differently. The processor 114 (FIG. 16), in this embodiment, may need to ensure the computed digest reflects only the data that corresponds exactly with the execution of the transaction and roll back any updates to the computed digest made for data written to external memory during speculative branching.

Rolling back updates to the computed digest due to misspeculation may be accomplished with a variety of methods. In one embodiment of the disclosure, computed digest snapshots may be taken in conjunction with other snapshots including, but not limited to, register maps snapshot when performing register renaming, as described by Buti et al.

In another embodiment of the disclosure, the processor 114 (FIG. 16) may update the computed digest with the HASH of the write-set during the execution of the transaction, but may additionally update the computed digest at the end of the transaction with a HASH created on a snapshot of the final GPR values. This may allow for a more robust computed digest without adding additional roll back concerns.

In another embodiment, the computed digest may also be updated with a memory address to which data within the transaction was written. This embodiment may allow the processor 114 (FIG. 16) to determine an instruction error occurred by detecting memory address differences when comparing reliability and/or computed digests.

In another embodiment of the disclosure, the computed digest may be generated at the end of the transaction rather than during the transaction.

Figure 7:
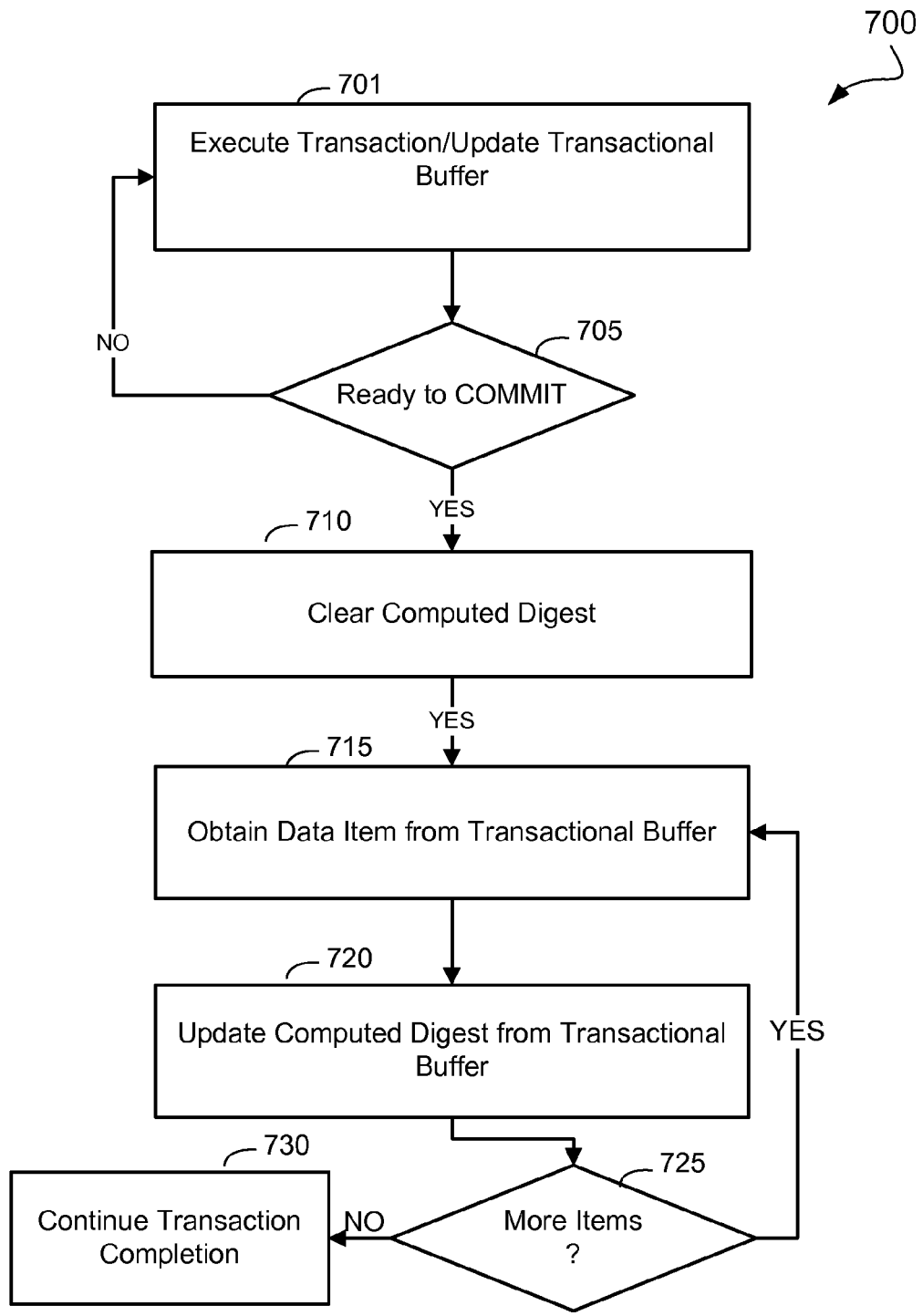
FIG. 7 is a flowchart illustrating steps performed by a processor for generating a digest at the end of a transactional execution, illustrated within the data processing environment of FIG. 16, in accordance with an embodiment of the disclosure.

Now referring to FIG. 7, flowchart 700 illustrates steps performed by the processor 114 (FIG. 16) for generating a computed digest at the end of a transactional execution, within the data processing environment of FIG. 16. The steps of the flowchart 700 illustrate the generation of a computed digest, in accordance with an embodiment of the disclosure. In this embodiment, the processor 114 (FIG. 16) may execute the transaction normally, at 701, utilizing an in-memory log buffer. The in-memory log buffer (hereafter "transaction buffer") may be used by memory management hardware to store all transactional data modifications during the transaction. The processor 114 (FIG. 16) may iterate, at 705, until the entire transactional region has been executed and the transaction may be ready to COMMIT. The processor 114 (FIG. 16) may, at 710, clear the computed digest and at 715 obtain the first of the transactional data modifications stored in the transaction buffer. The processor 114 (FIG. 16) may update the computed digest, at 720, with a HASH created for the data modification obtained from the transaction buffer. The processor 114 (FIG. 16) may, at 725, iterate through each transactional data modification stored in the transaction buffer and when all the transactional data modifications in the transaction buffer have been added to the computed digest, the processor 114 (FIG. 16) may continue, at 730, completing the transaction. This embodiment may eliminate the need for roll back processing since the data has already been successfully written or read before the computed digest is updated. A transaction delay may result with this embodiment due to the serial processing of the transaction buffer after the completion of the transaction execution.

Another embodiment of the disclosure, where the computed digest may be generated at the end of the transaction, may update the computed digest with a HASH created on a snapshot including, but not limited to, the final state of the memory written during the reliable-execution transaction, the final state of the memory read during the reliable-execution transaction, and the final values of the GPRs. The processor 114 (FIG. 16) may, in this embodiment, utilize the transaction buffer to create the HASH of the data modifications, but in this embodiment, only the final data values will be used to update the computed digest. As discussed above, this embodiment may eliminate the need for roll back processing since the data has already been successfully written or read before the computed digest is updated. Again, a transaction delay may result with this embodiment but the delay may be lessened due to utilizing only final data values to update the computed digest.

Now referring to FIGS. 8-13 which illustrate exemplary instructions for signaling the beginning of a reliability-digest-generating transaction, a reliability-digest-checking transaction and a reliable-execution transaction, hereinafter "digest transaction", and for signaling the end of the digest transaction, in accordance with an embodiment of the disclosure. These examples and figures are illustrative rather than limiting.

Figure 8:
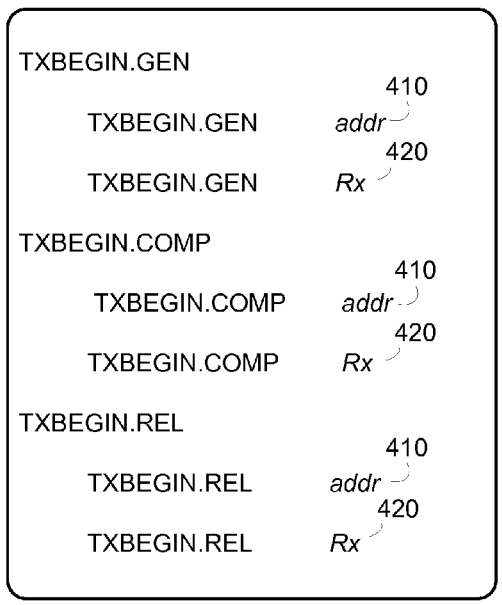
FIG. 8 is a block diagram depicting an exemplary instruction for signaling the beginning of a digest transaction, in accordance with an embodiment of the disclosure.
Figure 9:
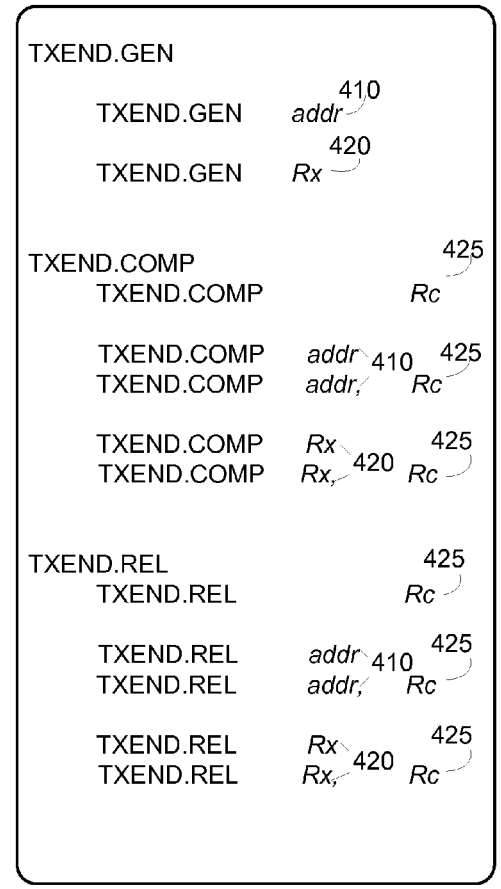
FIG. 9 is a block diagram depicting an exemplary instruction for signaling the end of a digest transaction, in accordance with an embodiment of the disclosure.

FIGS. 8 and 9 illustrate examples of new transaction begin instructions and a new transaction end instructions recognized within the computer system 1600 (FIG. 16). A TXBEGIN.GEN (FIG. 8) instruction may signal to the processor 114 (FIG. 16) to begin a reliability-digest-generating transaction. A TXBEGIN.COMP (FIG. 8) instruction may signal to the processor 114 (FIG. 16) to begin a reliability-digest-checking transaction. A TXBEGIN.REL (FIG. 8) instruction may signal to the processor 114 (FIG. 16) to begin a reliable-execution transaction. Collectively, the above exemplary instructions will be referred to as TXBEGIN.X when a description applies to all 3 instructions. A TXEND.GEN (FIG. 9) instruction may signal to the processor 114 (FIG. 16) to end the reliability-digest-generating transaction. A TXEND.COMP (FIG. 9) instruction may signal to the processor 114 (FIG. 16) to end the reliability-digest-checking transaction. A TXEND.REL (FIG. 9) instruction may signal to the processor 114 (FIG. 16) to end the reliable-execution transaction. Collectively, the above exemplary instructions will be referred to as TXEND.X when a description applies to all 3 instructions.

The TXBEGIN.X and the TXEND.X instructions may each include new operation codes recognized by the computer system 1600 (FIG. 16). The new TXBEGIN.X instructions may signal to the processor 114 (FIG. 16) that a digest transaction may be beginning and that all subsequent instructions until the associated TXEND.X instruction may be part of the transactional region and may be utilized in computing the digest. Both the TXBEGIN.X and the TXEND.X instructions may be specified with or without an input/output parameter 410, 420. The TXEND.COMP and the TXEND.REL instructions may be specified with or without an output parameter 425. The input/output parameter 410, 420 may specify a location used to save a generated reliability digest (TXBEGIN.GEN/TXEND.GEN, TXBEGIN.REL/TXEND.REL) or a location to obtain a previously generated reliability digest (TXBEGIN.COMP/TXEND.COMP) and may be specified on either the TXBEGIN.X instruction or on the TXEND.X instruction. The output parameter 425 on the TXEND.COMP and the TXEND.REL instructions may specify a location to return a result of the reliability-digest-checking transaction or the reliable-execution transaction.

For a digest transaction in which neither the TXBEGIN.X instruction nor the TXEND.X instruction includes the input/output parameter 410, 420, the generated reliability digest (TXBEGIN.GEN/TXEND.GEN, TXBEGIN.REL/TXEND.REL) may be saved to an implicit location defined by the computer system 1600 (FIG. 16) or the previously generated reliability digest (TXBEGIN.COMP/TXEND.COMP) may be obtained from an implicit location defined by the computer system 1600 (FIG. 16). For a TXEND.COMP or TXEND.REL instruction that does not include the output parameter 425, the return value and diagnostic data for the reliability-digest-checking transaction or the reliable-execution transaction may be placed in an implicit location defined by the computer system 1600 (FIG. 16). Implicit locations may be locations that do not interfere with computer software applications. Implicit locations may include, but are not limited to, a transaction control structure, a processor defined location, a defined register, a control register and a special purpose register. The implicit location may not be a part of the transaction state.

For a digest transaction where either the TXBEGIN.X or the TXEND.X instruction includes an addr (address) input/output parameter 410, the generated reliability digest (TXBEGIN.GEN/TXEND.GEN, TXBEGIN.REL/TXEND.REL) may be saved to a memory location specified by the addr parameter 410 or the previously generated reliability digest (TXBEGIN.COMP/TXEND.COMP) may be obtained from the memory location specified by the addr parameter 410.

For a digest transaction with either the TXBEGIN.X or the TXEND.X instruction including an Rx (register) input/output parameter 420 and a reliability digest small enough to fit within a register, the generated reliability digest (TXBEGIN.GEN/TXEND.GEN, TXBEGIN.REL/TXEND.REL) may be saved in the register specified by the Rx parameter 420 or the previously generated reliability digest (TXBEGIN.COMP/TXEND.COMP) may be obtained from the register specified by the Rx parameter 420. For a digest transaction with either the TXBEGIN.X or the TXEND.X instruction including an Rx register input/output parameter 420 and a reliability digest larger than may fit within the register, the generated reliability digest (TXBEGIN.GEN/TXEND.GEN, TXBEGIN.REL/TXEND.REL) may be saved to a memory location specified by the contents of the Rx register parameter 420 or the previously generated reliability digest (TXBEGIN.COMP/TXEND.COMP) may be obtained from the memory location specified by the Rx parameter 420. The specified register may not be part of the transaction state.

The TXEND.COMP and TXEND.REL instructions may additionally include an Rc output parameter 425 to return the results of comparing the reliability digest with the computed digest. The output parameter 425, specified by the computer software application, may include, but is not limited to, a register, a memory location addressed by the contents of the register Rc and an address (addr) of a memory location. The output parameter 425 may be set to a return value indicating a successful or failed equivalence comparison between the digests compared, along with a diagnostic data. A variety of other explicit or implicit locations for storing a digest may be practiced in conjunction and within the scope of the disclosure, including, but not limited to, control registers, fixed memory locations and memory locations in privileged memory.

Figure 10:
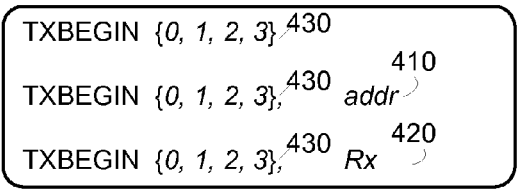
FIG. 10 is a block diagram depicting an exemplary instruction for signaling the beginning of a digest transaction, in accordance with an embodiment of the disclosure.
Figure 11:
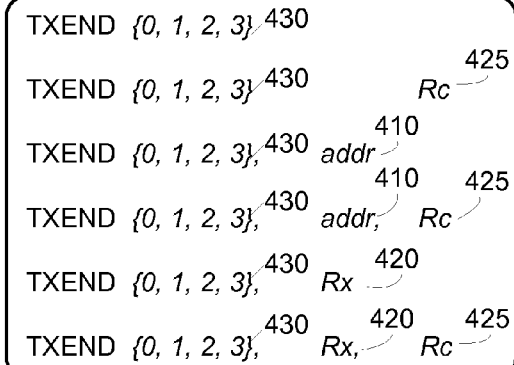
FIG. 11 is a block diagram depicting an exemplary instruction for signaling the end of a digest transaction, in accordance with an embodiment of the disclosure.

FIGS. 10 and 11 illustrate examples of an existing transaction begin instruction and an existing transaction end instruction, recognized within the computer system 1600 (FIG. 16), for which an immediate operand 430 has been added. A TXBEGIN {0, 1, 2, 3} (FIG. 10) instruction may signal the processor 114 (FIG. 16) to begin a digest transaction. A TXEND {0, 1, 2, 3} (FIG. 11) instruction may signal to the processor 114 (FIG. 16) to end the digest transaction. The TXBEGIN {0, 1, 2, 3} and the TXEND {0, 1, 2, 3} instructions may each include a new immediate operand {0, 1, 2, 3} 430 recognized by the computer system 1600 (FIG. 16). An immediate operand 430 of {0}, as exemplified in TXBEGIN 0, may signal to the processor 114 (FIG. 16) to execute the transaction as a traditional, non-digest transaction. An immediate operand 430 of {1}, as exemplified in TXBEGIN 1, may signal to the processor 114 (FIG. 16) that a reliability-digest-generating transaction may be beginning and all subsequent instructions until a TXEND 1 instruction may be part of the transactional region and may be utilized in generating the reliability digest. An immediate operand 430 of {2}, as exemplified in TXBEGIN 2, may signal to the processor 114 (FIG. 16) that a reliability-digest-checking transaction may be beginning and all subsequent instructions until a TXEND 2 instruction may be part of the transactional region and may be utilized in checking the transactional execution. An immediate operand 430 of {3}, as exemplified in TXBEGIN 3, may signal to the processor 114 (FIG. 16) that a reliable-execution transaction may be beginning and all subsequent instructions until a TXEND 3 instruction may be part of the transactional region and may be utilized in verifying the correctness of the transactional execution. Both the TXBEGIN {0, 1, 2, 3} and the TXEND {0, 1, 2, 3} instructions may be specified with or without an input/output parameter 410, 420 and the TXEND {0, 1, 2, 3} with or without an output parameter 425. The input/output parameter 410, 420 may specify a location to save a generated reliability digest (TXBEGIN {1, 3}/TXEND {1, 3}) or to obtain a previously generated reliability digest (TXBEGIN 2/TXEND 2) and may be specified either on the TXBEGIN {0, 1, 2, 3} instruction or on the TXEND {0, 1, 2, 3} instruction. The output parameter 425 on the TXEND {0, 1, 2, 3} instruction may specify a location to return a result of the digest transaction. For a traditional, non-digest transaction, the parameters 410, 420, 425 may be ignored. For a reliability-digest-generating transaction (TXBEGIN 1), the output parameter 425 may be ignored.

For a digest transaction in which neither the TXBEGIN {1, 2, 3} instruction nor the TXEND {1, 2, 3} instruction includes the input/output parameter 410, 420, the generated reliability digest (TXBEGIN {1, 3}/TXEND {1, 3}) may be saved to an implicit location defined by the computer system 1600 (FIG. 16) or the previously generated reliability digest (TXBEGIN 2/TXEND 2) may be obtained from an implicit location defined by the computer system 1600 (FIG. 16). For a TXEND {2, 3} instruction that does not include the output parameter 425, the return value and diagnostic data for the reliability-digest-checking transaction or the reliable-execution transaction may be placed in an implicit location defined by the computer system 1600 (FIG. 16). Implicit locations may be locations that do not interfere with computer software applications. Implicit locations may include, but are not limited to, a transaction control structure, a processor defined location, a defined register, a control register and a special purpose register. The implicit location may not be a part of the transaction state.

For a digest transaction in which either the TXBEGIN {1, 2, 3} or the TXEND {1, 2, 3} instruction includes an addr (address) input/output parameter 410 or an Rx (register) input/output parameter 420, and for a TXEND {2, 3} instruction which includes an Rc output parameter 425, the parameters are handled as discussed above for FIGS. 8 and 9.

Figure 12:
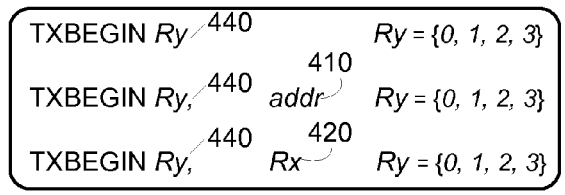
FIG. 12 is a block diagram depicting an exemplary instruction for signaling the beginning of a digest transaction, in accordance with an embodiment of the disclosure.
Figure 13:
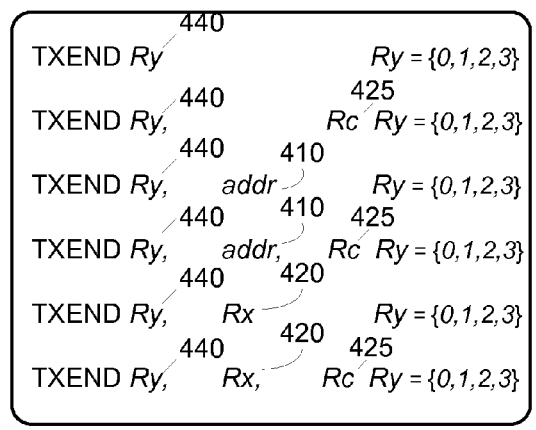
FIG. 13 is a block diagram depicting an exemplary instruction for signaling the end of a digest transaction, in accordance with an embodiment of the disclosure.

FIGS. 12 and 13 illustrate examples of an existing transaction begin instruction and an existing transaction end instruction, recognized within the computer system 1600 (FIG. 16), for which a register operand has been added. A TXBEGIN Ry (FIG. 12) instruction may signal the processor 114 (FIG. 16) to begin a digest transaction. A TXEND Ry (FIG. 13) instruction may signal to the processor 114 (FIG. 16) to end the digest transaction. The register operand 440, Ry, may contain an exemplary value of 0, 1, 2 or 3 recognized by the computer system 1600 (FIG. 16). A register operand 440 of Ry=0, as exemplified in TXBEGIN Ry (Ry=0), may signal to the processor 114 (FIG. 16) to execute the transaction as a traditional, non-digest transaction. A register operand 440 of Ry=1, as exemplified in TXBEGIN Ry (Ry=1) may signal to the processor 114 (FIG. 16) that a reliability-digest-generating transaction may be beginning and all subsequent instructions until a TXEND Ry (Ry=1) instruction may be part of the transactional region and may be utilized in generating the reliability digest. A register operand 440 of Ry=2, as exemplified in TXBEGIN Ry (Ry=2), may signal to the processor 114 (FIG. 16) that a reliability-digest-checking transaction may be beginning and all subsequent instructions until a TXEND Ry (Ry=2) instruction may be part of the transactional region and may be utilized in checking the transactional execution. A register operand 440 of Ry=3, as exemplified in TXBEGIN Ry (Ry=3), may signal to the processor 114 (FIG. 16) that a reliable-execution transaction may be beginning and all subsequent instructions until a TXEND Ry (Ry=3) instruction may be part of the transactional region and may be utilized in verifying the correctness of the transactional execution. Both the TXBEGIN Ry and the TXEND Ry instructions may be specified with or without an input/output parameter 410, 420 and the TXEND Ry (FIG. 13) with or without an output parameter 425. The input/output parameter 410, 420 may specify a location to save a generated reliability digest (TXBEGIN Ry/TXEND Ry (Ry={1, 3})) or to obtain a previously generated reliability digest (TXBEGIN Ry/TXEND Ry (Ry=2)) and may be specified either on the TXBEGIN Ry instruction or on the TXEND Ry instruction. The output parameter 425 on the TXEND Ry instruction may specify a location to return a result of the digest transaction. For a traditional, non-digest transaction, the parameters 410, 420, 425 may be ignored. For a reliability-digest-generating transaction (TXBEGIN Ry (Ry=1)), the output parameter 425 may be ignored.

For a digest transaction in which neither the TXBEGIN Ry instruction nor the TXEND Ry instruction includes the input/output parameter 410, 420, the generated reliability digest (TXBEGIN Ry/TXEND Ry (Ry={1, 3})) may be saved to an implicit location defined by the computer system 1600 (FIG. 16) or the previously generated reliability digest (TXBEGIN Ry/TXEND Ry (Ry=2)) may be obtained from an implicit location defined by the computer system 1600 (FIG. 16). For a TXEND Ry (Ry={2, 3}) instruction that does not include the output parameter 425, the return value and diagnostic data for the reliability-digest-checking transaction or reliable-execution transaction may be placed in an implicit location defined by the computer system 1600 (FIG. 16). Implicit locations may be locations that do not interfere with computer software applications. Implicit locations may include, but are not limited to, a transaction control structure, a processor defined location, a defined register, a control register and a special purpose register. The implicit location may not be a part of the transaction state.

For a digest transaction where either the TXBEGIN Ry (Ry={1, 2, 3}) or the TXEND Ry (Ry={1, 2, 3}) instruction includes an addr (address) input/output parameter 410 or an Rx (register) input/output parameter 420, and for a TXEND Ry (Ry={2, 3}) instruction which includes an Rc output parameter 425, the parameters are handled as discussed above for FIGS. 8 and 9.

Figure 14:
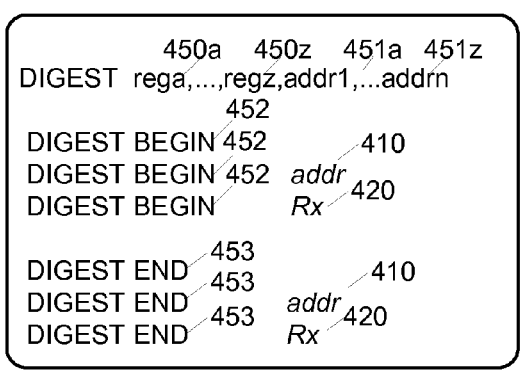
FIG. 14 is a block diagram depicting an exemplary instruction for including specific data in a digest or for starting and ending digest generation during the transactional execution, in accordance with an embodiment of the disclosure.

Now referring to FIG. 14 which illustrates an exemplary instruction, DIGEST, for including specific data in the reliability digest or for starting and ending reliability-digest-generation during the transactional execution, in accordance with an embodiment of the disclosure. This example and figure is illustrative rather than limiting.

FIG. 14 illustrates an example of a new DIGEST instruction, recognized within the computer system 1600 (FIG. 16), which may allow a computer software application to instruct the processor 114 (FIG. 16) to update the reliability digest with computer software application specified data. The DIGEST instruction may include one or more reg (register) and/or addr (address) input parameters 450a-450z, 451a-451z specifying data to include in the update of the computed digest. The one or more registers include, but are not limited to, general registers, floating-point registers and control registers. The specified registers and/or addresses may be used to update the computed digest during the execution of the digest transaction as they are modified or as a snapshot of their values at the end of the digest transaction.

In another embodiment, the DIGEST instruction may allow the computer software application to instruct the processor 114 (FIG. 16) to generate a computed digest within a traditional, non-digest transaction, upon the processor 114 (FIG. 16) recognizing a DIGEST instruction with a BEGIN operand 452. A DIGEST instruction with an END operand 453 may stop the generating of the computed digest. The DIGEST BEGIN and DIGEST END instructions may include an input/output parameter 410, 420 as discussed above with reference to FIGS. 8-13.

The following exemplary code segments illustrate embodiments of a computer software application's addressing the detection and handling of transient failures and permanent execution unit failures utilizing reliability-digest-generating transactions and reliability-digest-checking transactions in conjunction with the TXBEGIN.X and TXEND.X instructions described above with reference to FIGS. 8 and 9.

Table 5 represents an exemplary C code segment including inline reliability-digest-generating and reliability-digest-checking transactions.

TABLE 5

C Code Example

```
#define threshold 10
extern int a[ ], b[ ];
foo( )
{
int digest;
```

TABLE 5-continued

C Code Example

```
int fail;
a[0] = 0;
b[0] = 0;
fail = 0;
retry:
asm volatile ("txbegin.gen"
    : /* no outputs */
    : /* no inputs */
    : /* clobber list */ "memory");
a[0] = a[0] +1;
b[0] = a[0] +2;
asm volatile ("txend.gen %0"
    : /* output digest */ "=r" (digest)
    : /* no inputs */
    : /* clobber list */ "memory" );
asm volatile ("txbegin.comp"
    : /* no outputs */
    : /* no intputs */
    : /* clobber list */ "memory");
a[0] = a[0] +1;
b[0] = a[0] +2;
asm volatile ("txend.comp cr0, %0\; bne [failure]"
    : /* no output */
    : /* digest as input */ "r" (digest)
    : /* clobber list */ "x", "memory"
    : /* label for failure processing */ failure);
more_computation( );
return;
failure:
fail ++;
if (fail < threshold)
    goto retry
/* e.g., log, terminate application, migrate, etc. */
advanced_failure_handling( );
}
```

Table 6 represents an exemplary C code segment with language extensions including reliability-digest-generating and reliability-digest-checking transactions. The compiler may translate the transaction instructions into machine operands understood by the computer system 1600 (FIG. 16) to begin or end a digest transaction.

TABLE 6

C Code With Language Extensions Example

```
#define threshold 10
extern int a[ ], b[ ];
foo( )
{
int digest;
int fail;
a[0] = 0;
b[0] = 0;
fail = 0;
retry:
transaction_begin_gendigest ;
a[0] = a[0] +1;
b[0] = a[0] +2;
transaction_end_gendigest (digest);
transaction_begin_comparedigest ;
a[0] = a[0] +1;
b[0] = a[0] +2;
transaction_end_comparedigest(digest,failure)
more_computation( );
return;
failure:
fail ++;
if (fail < threshold)
    goto retry
/* e.g., log, terminate application, migrate, etc. */
advanced_failure_handling( );
}
```

Table 7 represents an exemplary assembler code segment as it may be generated by a compiler. This code sample demonstrates one of the risks of computer software application implementation of a reliability-digest-generating transactions followed by a reliability-digest-checking transaction where a compiler may generate different assembler code for each of the complementary transactions.

TABLE 7

Generated Assembler Code Example

| | |
|---|---|
| L.foo: | ld 10,.LC1@toc(2) ; base address of a |
| | ld 9,.LC0@toc(2) ; base address of b |
| | mflr 0 |
| | li 11,10 |
| | std 0,16(1) |
| | stdu 1,−112(1) |
| | li 0,0 |
| | mtctr 11 |
| | stw 0,0(10) |
| | stw 0,0(9) |
| .L2: | txbegin.gen |
| | lwz 11,0(9) |
| | addi 11,11,1 |
| | stw 11,0(9) |
| | addi 11,11,2 |
| | stw 11,0(10) |
| | txend.gen 0 |
| | txbegin.comp |
| | lwz 11,0(9) |
| | addi 11,11,1 |
| | addi 8,11,2 |
| | stw 11,0(9) |
| | stw 8,0(10) |
| | txend.comp cr0, 0 |
| | bne .L3 |
| .L9: | bl more_computation |
| | nop |
| | addi 1,1,112 |
| | ld 0,16(1) |
| | mtlr 0 |
| | blr |
| .L3: | bdnz L2 |
| | bl advanced_failure_handling |
| | nop |
| | addi 1,1,112 |
| | ld 0,16(1) |
| | mtlr 0 |
| | blr |

In one embodiment of the disclosure, the compiler may receive a single copy of the transaction sequence and may replicate the code automatically in a manner adapted to reliably generate the same digest. In another embodiment, such a compiler also may also generate the reliability-digest-checking transaction code automatically, without computer software application interaction.

Table 8 is an exemplary code segment illustrating an embodiment of a computer software application handling a transient failure or permanent execution unit failures utilizing a reliable-execution transaction.

TABLE 8

Reliable-Execution Transaction Example

```
extern int a[ ], b[ ];
foo( )
{
a[0] = 0;
b[0] = 0;
fail = 0;
retry:
reliable_transaction_begin;
a[0] = a[0] +1;
```

TABLE 8-continued

Reliable-Execution Transaction Example

```
        b[0] = a[0] +2;
        reliable_transaction_end;
        more_computation( );
        return;
    }
```

In at least one such embodiment above, the recovery sequence may be standardized and automatically generated by the compiler. In another embodiment, the computer software application provides additional parameters, for example, a retry count and an error function to handle transactional execution failure, as illustrated in the exemplary code segment in Table 9 below.

TABLE 9

Retry Count and Error Function Example

```
    extern int a[ ], b[ ];
    foo( )
    {
        a[0] = 0;
        b[0] = 0;
        fail = 0;
    retry:
        reliable_transaction_begin (retry_count = 10, error_function );
        a[0] = a[0] +1;
        b[0] = a[0] +2;
        reliable_transaction_end;
        more_computation( );
        return;
    }
```

Transaction nesting may be used in conjunction with digest transactions. Digest transactions may be nested within both digest transactions and non-digest transactions. Non-digest transaction may be nested within digest transaction. Digest and non-digest transactions may be multiply nested. An inner-most computed digest may be combined progressively outward with each previous nesting level transaction's computed digest until the final computed digest reflects the execution of all nested transactions.

In one embodiment of the disclosure, the computed digest may be updated directly, during the execution of a nested transaction. The processor 114 (FIG. 16) may save a snapshot of the computed digest, as a nesting level snapshot of the computed digest, each time a nested transaction is started. The processor 114 (FIG. 16) may update the computed digest during the execution of each nested transaction. Upon an unsuccessful completion of one or more of the nested transactions, the processor 114 (FIG. 16) may restore the computed digest from the unsuccessful nested transaction's nesting level snapshot of the computed digest.

In another embodiment, the computed digest may be updated only when all nested transactions have completed. The processor 114 (FIG. 16) may generate a new nesting level computed digest for each new nested transaction. The processor 114 (FIG. 16) may also save a snapshot of the computed digest, as a nesting level snapshot of the computed digest, each time a nested transaction is started. For the original non-nested transaction, the snapshot may reflect the computed digest; for a nested transaction, the snapshot may reflect the nesting level computed digest. As each nested transaction completes, the processor 114 (FIG. 16) may replace the previous nesting level transaction's nesting level computed digest with a merge of the nested transaction's nesting level computed digest and the nesting level snapshot of the computed digest saved prior to the nested transaction. For the original non-nested transaction, the computed digest may be updated. Upon an unsuccessful completion of one or more of the nested transactions, the processor 114 (FIG. 16) may clear the nesting level computed digest of the unsuccessful nested transaction.

Now referring to FIG. 15, flowchart 1500 illustrates steps performed by the processor 114 (FIG. 16) for nesting digest transactions, within the data processing environment of FIG. 16. The steps of the flowchart 1500 illustrate the generation of a computed digest in which the computed digest may be updated directly, during the execution of a nested digest transaction, in accordance with an embodiment of the disclosure. In this embodiment, the processor 114 (FIG. 16) may start a non-nested, digest transaction, at 1510. The processor 114 (FIG. 16) may update the computed digest for this transaction for each instruction in the transactional region, at 1515. At 1520, for an instruction in the transactional region that may be a transaction begin for a nested transaction, the processor 114 (FIG. 16) may, at 1525, save a snapshot of the current computed digest as a nesting level snapshot of the computed digest. The snapshot of the current computed digest may be saved to a location including, but not limited to, a store buffer, a cache, and a software array. The processor 114 (FIG. 16) may increment a nesting level count, at 1530, to allow the processor 114 (FIG. 16) to know when all nested transactions have completed. The processor 114 (FIG. 16) may execute each instruction in the nested transaction and, in this embodiment, update the computed digest with transactional execution data from the nested transaction, at 1535. For a successfully completed nested transaction, as determined at 1545, the processor 114 (FIG. 16) may decrement the nesting level count, at 1550, clear the saved, nesting level snapshot of the computed digest at the corresponding nesting level, at 1560, and return to the execution of the digest transaction. For the digest transaction that may be a reliability-digest-generating transaction, the memory read and write sets of the nested transaction may be discarded along with the memory updates. For the digest transaction that may be a reliability-digest-checking transaction instead, the memory read and write sets of the nested transaction may be merged into the reliability-digest-checking transaction's memory read and write sets. The nested transaction's memory updates may be discarded. For an unsuccessfully completed nested transaction, determined at 1545, the processor 114 (FIG. 16) may roll back the memory updates of the failed nested transaction, at 1547, restore the computed digest from the saved, nesting level snapshot of the computed digest, at 1555, and retry the nested transaction, at 1535. The processor 114 (FIG. 16) may iterate, at 1565, through the remaining instructions in the digest transaction's transactional region. For an unsuccessful completion of the digest transaction, determined at 1570, the processor 114 (FIG. 16) may clear the computed digest, at 1580 and retry the transaction.

When the digest transaction is not a nested transaction itself and completes successfully, as determined at 1570, the processor 114 (FIG. 16) may, at 1585, for a digest transaction that is a reliability-digest-generating transaction, save the computed digest which includes the nested transaction's updates, discard the memory read and write sets, discard the memory updates and restore the initial machine state. Alternately, the processor 114 (FIG. 16) may, at 1585, for a digest transaction that is a reliability-digest-checking transaction whose digests compare successfully, COMMIT the memory updates which include the nested transaction's memory updates and return completion information to the computer software application. For the successful completion of the digest transaction, determined at 1570, that may itself be a nested transaction, the processor 114 (FIG. 16) may continue processing at step 1550 of a transaction at the previous transaction nesting level of this digest transaction.

With continuing reference to FIG. 15, the steps of the flowchart 1500 with the following modifications illustrate the generation of a computed digest in which the computed digest may be updated only when all nested transactions have completed, in accordance with an embodiment of the disclosure. The processor 114 (FIG. 16), at 1525, may save a snapshot of the current computed digest as a nesting level snapshot of the computed digest and initialize a nesting level computed digest for the nested transaction. The processor 114 (FIG. 16) may, at 1535, execute each instruction in the nested transaction and, in this embodiment, update the nesting level computed digest with transactional execution data from the nested transaction. In response to an unsuccessful nested transaction, the processor 114 (FIG. 16) may, at 1555, clear the nesting level computed digest of the failed transaction in preparation for retry. In response to a successfully completed nested transaction, the processor 114 (FIG. 16) may, in this embodiment, at 1560, replace the previous nesting level transaction's nesting level computed digest with a merge of the nested transaction's nesting level computed digest and the nesting level snapshot of the computed digest saved prior to the nested transaction. When the nesting level indicates that all nested transactions have completed, the computed digest may be updated.

In another embodiment, the nested transaction may be a reliability-digest-checking transaction. In this embodiment, the processor 114 (FIG. 16) may merge the read sets and write sets of the nested transaction with the read and write sets of the previous nesting level transaction and discard the memory updates of the successfully completed and successfully executed reliability-digest-checking nested transaction. The nested reliability-digest-checking transaction may not COMMIT the memory updates. For a digest mis-compare in a nested reliability-digest-checking transaction, the processor 114 (FIG. 16) may transfer control to a sequence of instruction in the previous nesting level transaction that may include, but are not limited to, instructions to restore the computed digest from the saved nesting level snapshot of the computed digest from the previous nesting level.

In at least one embodiment, the sequence of instructions corresponding to the digest mis-compare transfer of control may be written such that retry attempts may not be incorporated into the computed digest. In one embodiment, this may be achieved by preventing updates to the digest during the above sequence of instructions. In another embodiment, explicit DIGEST BEGIN and DIGEST END (FIG. 14) instructions may be used to disabled the processor 114 (FIG. 16) from updating the digest during execution of recovery logic to avoid capturing possible non-replicatable execution paths through recovery logic as part of the digest.

In another embodiment, a non-digest transaction may be nested within a digest transaction. In this embodiment, when the nested transaction is encountered, it may be processed to completion as described above with reference to FIG. 15, including the updating of the computed digest to include the transactional region of the nested transaction. If the nested transaction fails, the nested transaction may be restarted. When the nested transaction completes successfully, the memory read and write sets and the pending memory updates may be merged with the previous nesting level transaction's memory read and write set and pending memory updates. Any instrumentation, diagnostic or other execution information associated with the nested transaction may also be included in the previous nesting level transaction's instrumentation, diagnostic or other data. When the previous nesting level transaction is not a nested transaction itself and completes successfully, the processor 114 (FIG. 16) may for a reliability-digest-checking transaction with a successful digest compare, COMMIT the results of the nested transaction in conjunction with the COMMIT of the reliability-digest-checking transaction. Alternately, for a successful non-nested reliability-digest-generating transaction, the processor 114 (FIG. 16) may discard the results of the nested transaction in conjunction with the discarding of the reliability-digest-generating transaction, and may save the computed digest (along with any diagnostic, instrumentation, or other execution data) including information from both the digest transaction and the nested non-digest transaction.

In another embodiment, a digest transaction may be nested within a non-digest transaction. In this embodiment, when the nested digest transaction is encountered, a computed digest may be initialized and updated for the instructions in the nested transactional region. If the nested transaction fails, the nested transaction's computed digest may be reinitialized and the nested transaction may be restarted. For a successfully completed, nested reliability-digest-generating transaction, the processor 114 (FIG. 16) may merge the memory read and write sets of the nested reliability-digest-generating transaction into the non-digest transaction. The memory updates of the nested reliability-digest-generating transaction may be discarded. The nested reliability-digest-generating transaction may save the computed digest as a nesting level reliability digest. In another embodiment, the memory read and write sets of the nested reliability-digest-generating transaction may be discarded along with the memory updates and only the computed digest may be saved as a nesting level reliability digest. For an unsuccessfully completed, nested reliability-digest-checking transaction, the nested transaction's computed digest may be reinitialized and the nested transaction may be restarted. For a successfully completed, nested reliability-digest-checking transaction whose digests compare successfully, the processor 114 (FIG. 16) may merge the memory read and write sets of the nested reliability-digest-checking transaction into the read and write sets of the non-digest transaction. When a digest mis-compare in a nested reliability-digest-checking transaction occurs, the processor 114 (FIG. 16) may transfer control to a sequence of instruction in the non-digest transaction.

In another embodiment, flattened nesting may be implemented in conjunction with digest transactions. Flattened nesting may allow the nested transactions to be automatically integrated into the outermost transaction.

Referring now to the nesting of transactions, transactional execution for reliability can further be practiced in conjunction with transactional nesting.

In one embodiment, synchronization transactions are included in a reliability transaction. In according with the nesting of a synchronization transaction in a reliability transaction, in one embodiment, flattened nesting is implemented and an interior synchronization transaction (i.e., a transaction directed at synchronizing multiple threads in accordance with prior art) is automatically integrated in an outer digest generating and digest checking transaction.

In another embodiment, a synchronization transaction is processed as a nested transaction. In this embodiment, when an interior (nested) synchronization transaction is encountered, a currently computed reliability digest is saved to a new storage location. A new reliability digest is initialized for the nested transaction. A reliability digest is computed for the synchronization transaction. The synchronization transaction is processed. If the synchronization transaction fails, a synchronization transaction may be restarted. The reliability digest for the restarted synchronization transaction is reset and a new reliability digest is computed. When the synchronization transaction completes successfully, the memory read and write sets' and pending memory updates are merged in the digest generating or digest checking reliability transaction. Any instrumentation, diagnostic or other execution information associated with a nested transaction may also be included in the outer reliability transaction's instrumentation, diagnostic or other data. The stored reliability transaction's reliability digest which had been stored prior to the synchronization transaction is recovered, and preferably combined with the (successful) synchronization transactions computed reliability digest. The so combined and updated new reliability digest is initialized into the current reliability digest for further use by the other reliability transaction. When an outer reliability transaction completes, an outer digest checking reliability transaction commits the results of the nested synchronization transaction in conjunction with the commit of the outer reliability transaction, when the digest compare is successful. When an outer reliability transaction completes, an outer digest generating reliability transaction discards the results of the nested synchronization transaction in conjunction with the discarding of the outer reliability transaction, and present a digest (and any debug, instrumentation, or other execution data) including both an outer reliability transaction and an inner synchronization transaction.

Referring now to the nesting of a reliability digest generating transaction, or a reliability digest checking transaction in a synchronization transaction, reliability digest generating and reliability digest checking instructions are preferably processed as true nested transactions. In this embodiment, when an interior (nested) reliability transaction is encountered, a new reliability digest is initialized for the nested transaction. A reliability digest is computed for a reliability digest generating transaction as a nested transaction. If the digest generating transaction fails, a digest generating transaction may be restarted. The reliability digest for the restarted digest generating transaction is reset and a new reliability digest is computed. When the digest generating transaction completes successfully, the memory read and write sets are merged into the synchronization transaction, and the memory updates are discarded. The reliability digest is returned. In another embodiment, the memory read and write sets are discarded and the memory updates are discarded. The reliability digest is returned.

A reliability digest is computed for a reliability digest checking transaction as a nested transaction. If the digest checking transaction fails, a digest checking transaction may be restarted. The reliability digest for the restarted digest checking transaction is reset and a new reliability digest is computed. When the digest checking transaction completes successfully, and the digest comparison indicates a reliable execution, the memory read and write sets and the memory updates are merged into the synchronization transaction. When a digest miscompares, control is transferred to a digest miscompare logic executed as a sequence of computer instructions within the synchronization transaction.

Referring now to the nesting of a reliability digest generating transaction, or a reliability digest checking transaction in a reliability digest generating or reliability digest comparing transaction, reliability digest generating and reliability digest checking instructions are preferably processed as true nested transactions. In this embodiment, when an interior (nested) reliability transaction is encountered, the current reliability transactions digest (for both digest generating and digest checking cases) is stored, and a new reliability digest is initialized for the nested transaction. A reliability digest is computed for a reliability digest generating transaction as a nested transaction. If the digest generating transaction fails, a digest generating transaction may be restarted. The reliability digest for the restarted digest generating transaction is reset and a new reliability digest is computed. When the digest generating transaction completes successfully, the memory read and write sets are merged into the outer reliability transaction, and the memory updates are discarded. The reliability digest is returned. The saved reliability digest of the outer transaction is recovered and reinitialized to accrue additional results. In another embodiment, the memory read and write sets are discarded and the memory updates are discarded. The reliability digest is returned. The saved reliability digest of the outer transaction is recovered and reinitialized to accrue additional results.

A reliability digest is computed for a reliability digest checking transaction as a nested transaction in a reliability transaction. In this embodiment, when an interior (nested) reliability transaction is encountered, the current reliability transactions digest (for both digest generating and digest checking cases) is stored, and a new reliability digest is initialized for the nested transaction. If the digest checking transaction fails, a digest checking transaction may be restarted. The reliability digest for the restarted digest checking transaction is reset and a new reliability digest is computed. When the digest checking transaction completes successfully, and the digest comparison indicates a reliable execution, the memory read and write sets and the memory updates are merged into the reliability transaction. The outer transactions saved digest is recovered. The inner reliability transaction checking transaction's digest is merged into the outer recovered digest. The so computed digest is reinitialized and used by the outer transaction. When a digest miscompares, control is transferred to a digest miscompare logic executed as a sequence of computer instructions within the synchronization transaction. The outer digest is recovered, and restored. The reliability checking transaction's digest is not merged into the outer transaction's digest.

In at least one embodiment, the sequence corresponding to the digest miscompare recover is written to avoid different digest results based on the number of retries. In one embodiment, this is achieved by avoiding updates to state included in the digest. In another embodiment, explicit digest_on and digest_off are provided. When miscompare recovery logic is executed, digest generation is disabled by executing recovery logic within pairs of digest_off and digest_on instructions to avoid capturing different execution paths through recovery logic as part of the digest.

When an outer reliability digest generating transaction completes, all memory updates are discarded and a digest including inner transactions is provided.

When an outer reliability digest checking transaction completes and the digest compares successfully, all memory updates are committed to memory, and including those of inner transactions having been merged into an outer transaction.

Referring now to FIG. 16, computer system 1600 may include respective sets of internal components 800 and external components 900. Each of the sets of internal components 800 includes one or more processors 114; one or more computer-readable RAMs 822; one or more computer-readable ROMs 824 on one or more buses 826; one or more operating systems 828; one or more software applications 829; and one or more computer-readable tangible storage devices 830. The one or more operating systems 828 are stored on one or more of the respective computer-readable tangible storage devices 830 for execution by one or more of the respective processors 114 via one or more of the respective RAMs 822 (which typically include cache memory). The computer system 1600, in one embodiment of the disclosure, supports the multicore transactional memory environment and TM-enabled processors of FIG. 1. FIG. 16 illustrates the TM-enabled processors of FIG. 1, shown in the context of a computer system, as processors 114 of the computer system 1600. The processors 114, in this embodiment, are also configured to identify the reliable-execution instructions (FIGS. 8-13) and are enabled to check the reliability digest. The processors 114 are also connected by one or more Digest Broadcast Buses 650 configured to communicate reliable-execution information. In the embodiment illustrated in FIG. 16, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838 and operating system 828 that are associated with computer system 1600, can be downloaded to computer system 1600 from an external computer (e.g., server) via a network (for example, the Internet, a local area network or other, wide area network) and respective network adapters or interfaces 836. From the network adapters (or switch port adapters) or interfaces 836, the firmware 838 and operating system 828 associated with computer system 1600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 17:
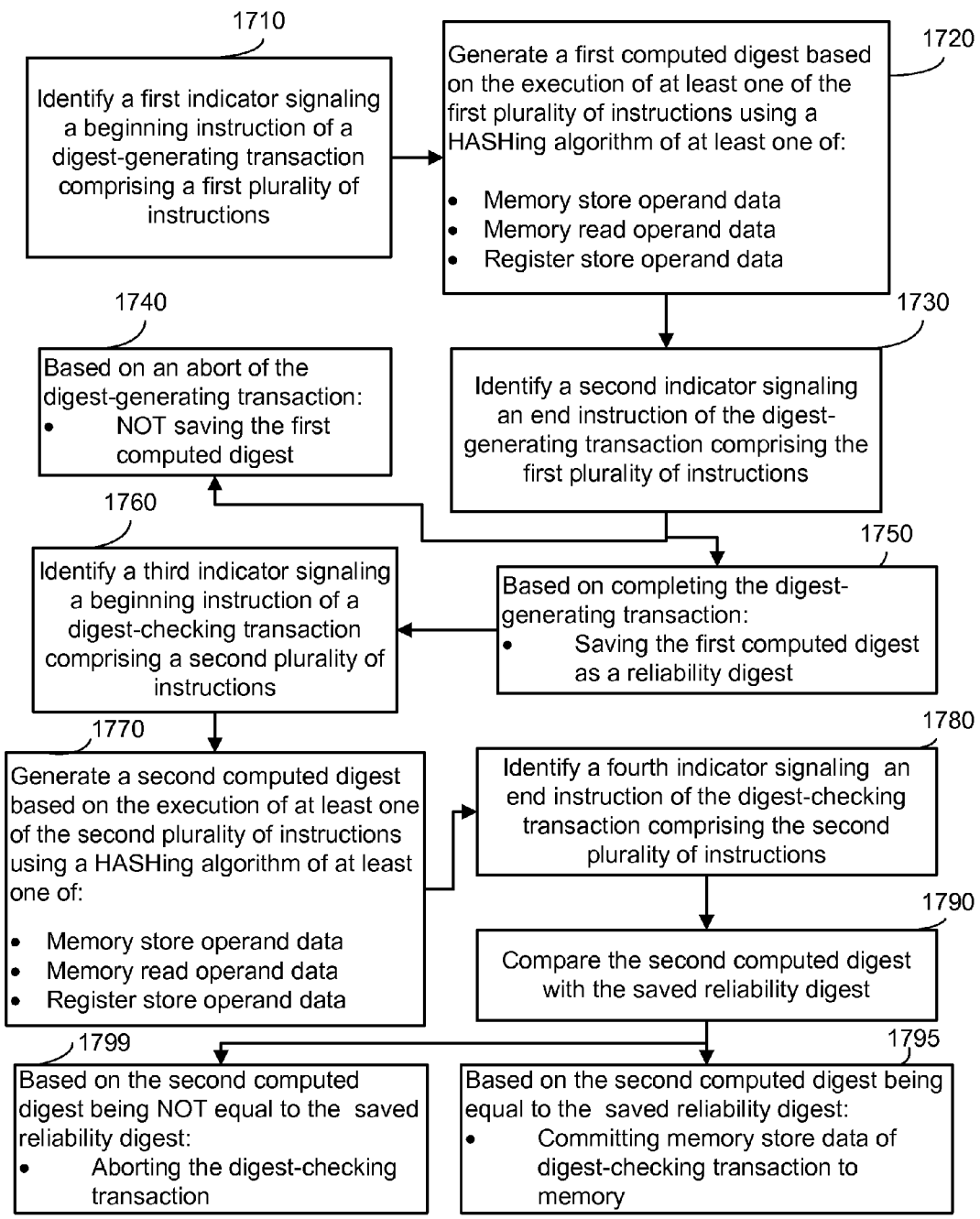
FIG. 17 depicts an exemplary flow for ensuring reliable execution of transactions by using digests.

Referring now to FIG. 17, in an embodiment of the disclosure, reliable execution of transactions may be ensured by performing transactions using digests, in a transactional memory environment for performing transactional executions where memory store data of the transaction may be committed to memory at transaction completion. The transactional memory environment may include a digest-generating transaction to generate a computed digest and a digest-checking transaction to compare computed digests. In an embodiment, the computer system may execute both the digest-generating transaction and the digest-checking transactions on transaction initiation without computer software application modification. In an embodiment, a plurality of instructions of the digest-generating transaction and a plurality of instructions of the digest-checking transaction may execute in parallel and on different threads. Memory conflicts between the digest-generating transaction's plurality of instructions and the digest-checking transaction's plurality of instructions may be suppressed. In one embodiment, a token may be attached to a reliability digest to identify the digest-generating transaction that saved the reliability digest. In another embodiment, a token may be attached to memory store data to identify the digest-generating and the digest-checking transactions such that conflicts may be suppressed for memory store data between digest-generating and digest-checking transactions identified with the same token.

In an embodiment, a computer system may, at 1710, identify a first indicator signaling a beginning instruction of a digest-generating transaction comprising a first plurality of instructions. The digest-generating transaction may suppress committing memory store data of the digest-generating transaction to memory. The computer system may then, at 1720, generate a first computed digest based on the execution of at least one of the first plurality of instructions. The first computed digest may be generated by a HASHing algorithm, hashing at least one of: memory store operand data of the first plurality of instructions, memory read operand data of the first plurality of instructions, and register store operand data of the first plurality of instructions. Upon identifying, at 1730, a second indicator associated with the first plurality of instructions signaling an ending instruction of the digest-generating transaction comprising the first plurality of instructions, and based on completing the digest-generating transaction, saving, at 1750, the first computed digest as a reliability digest. Based on aborting the transaction, at 1740, not saving the first computed digest.

The computer system may then, at 1760, identify a third indicator signaling a beginning instruction of a digest-checking transaction comprising a second plurality of instructions. The computer system may, at 1770, generate a second computed digest based on the execution of at least one of the second plurality of instructions. The second computed digest may be generated using the same HASHing algorithm used for generating the first computed digest, hashing at least one of: memory store operand data of the second plurality of instructions, memory read operand data of the second plurality of instructions, and register store operand data of the second plurality of instructions. The first and second computed digests may be replicable for error-free executions of the plurality of instructions. Upon identifying, at 1780, a fourth indicator associated with the second plurality of instructions signaling an ending instruction of the digest-checking transaction comprising the second plurality of instructions, may compare, at 1790, the second computed digest with the saved reliability digest. Based on the second computed digest being equal to the reliability digest, completing, at 1795, the digest-checking transaction and committing the memory store data of the digest-checking transaction to memory. Based on the second computed digest being not equal to the reliability digest, aborting, at 1799, the digest-checking transaction.

In another embodiment, the computed digests may be generated upon identifying the ending instruction of the transaction and may be based on a final snapshot of data buffered during the transaction for commitment.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for performing a transaction in a transactional memory environment for performing transactional executions, wherein memory store data of the transaction are committed to memory at transaction completion, the transactional memory environment comprising a digest-generating transaction to generate a computed digest and a digest-checking transaction to compare computed digests, the computer program product comprising:
    a computer readable storage medium readable by a processing circuit and storing instructions for execution by the processing circuit for performing a method comprising:
    identifying, by a computer system, a first indicator, the first indicator signaling a beginning instruction of a digest-generating transaction comprising a first plurality of instructions, the digest-generating transaction suppresses committing memory store data of the digest-generating transaction to memory;
    generating, by the computer system, a first computed digest based on the execution of at least one of the first plurality of instructions;
    identifying, by the computer system, a second indicator associated with the first plurality of instructions, the second indicator signaling an ending instruction of the digest-generating transaction comprising the first plurality of instructions, wherein the first computed digest is replicable for an error-free execution of the first plurality of instructions;
    saving, by the computer system, the first computed digest, as a reliability digest, based on completing the digest-generating transaction;
    not saving the first computed digest based on an abort of the digest-generating transaction;
    identifying, by the computer system, a third indicator, the third indicator signaling a beginning instruction of a digest-checking transaction comprising a second plurality of instructions, and where the first plurality of instructions and the second plurality of instructions execute in parallel on different threads, memory conflicts between the first plurality of instructions and the second plurality of instructions are suppressed;
    generating, by the computer system, a second computed digest based on execution of at least one of the second plurality of instructions;
    identifying, by the computer system, a fourth indicator associated with the second plurality of instructions, the fourth indicator signaling an ending instruction of the digest-checking transaction comprising the second plurality of instructions, wherein the second computed digest is replicable for an error-free execution of the second plurality of instructions;
    comparing, by the computer system, the second computed digest with the saved reliability digest;
    based on the second computed digest being equal to the reliability digest, completing the digest-checking transaction and committing the memory store data of the digest-checking transaction to memory; and
    based on the second computed digest being not equal to the reliability digest, aborting the digest-checking transaction.

2. The computer program product according to claim 1, wherein the first computed digest is generated by a HASHing algorithm, hashing at least one of:
    memory store operand data of the first plurality of instructions;
    memory read operand data of the first plurality of instructions; and
    register store operand data of the first plurality of instructions.

3. The computer program product according to claim 1, wherein a token is attached to the reliability digest to identify the digest-generating transaction that saved the reliability digest.

4. The computer program product according to claim 1, wherein a token is attached to memory store data to identify the digest-generating and the digest-checking transactions, conflicts are suppressed for memory store data between the digest-generating and the digest-checking transactions identified with the same token.

5. The computer program product according to claim 1, wherein the computer system executes both the digest-generating transaction and the digest-checking transactions on a transaction initiation without computer software application modification.

6. A computer system for performing a transaction in a transactional memory environment for performing transactional executions, wherein memory store data of the transaction are committed to memory at transaction completion, the transactional memory environment comprising a digest-generating transaction to generate a computed digest and a digest-checking transaction to compare computed digests, the computer system comprising:
    a memory; and
    a processor in communication with the memory, wherein the computer system is configured to perform a method, said method comprising:
    identifying, by a computer system, a first indicator, the first indicator signaling a beginning instruction of a digest-generating transaction comprising a first plurality of instructions, the digest-generating transaction suppresses committing memory store data of the digest-generating transaction to memory;

generating, by the computer system, a first computed digest based on the execution of at least one of the first plurality of instructions;

identifying, by the computer system, a second indicator associated with the first plurality of instructions, the second indicator signaling an ending instruction of the digest-generating transaction comprising the first plurality of instructions, wherein the first computed digest is replicable for an error-free execution of the first plurality of instructions;

saving, by the computer system, the first computed digest, as a reliability digest, based on completing the digest-generating transaction;

not saving the first computed digest based on an abort of the digest-generating transaction;

identifying, by the computer system, a third indicator, the third indicator signaling a beginning instruction of a digest-checking transaction comprising a second plurality of instructions, and where the first plurality of instructions and the second plurality of instructions execute in parallel on different threads, memory conflicts between the first plurality of instructions and the second plurality of instructions are suppressed;

generating, by the computer system, a second computed digest based on execution of at least one of the second plurality of instructions;

identifying, by the computer system, a fourth indicator associated with the second plurality of instructions, the fourth indicator signaling an ending instruction of the digest-checking transaction comprising the second plurality of instructions, wherein the second computed digest is replicable for an error-free execution of the second plurality of instructions;

comparing, by the computer system, the second computed digest with the saved reliability digest;

based on the second computed digest being equal to the reliability digest, completing the digest-checking transaction and committing the memory store data of the digest-checking transaction to memory; and based on the second computed digest being not equal to the reliability digest, aborting the digest-checking transaction.

7. The computer system according to claim 6, wherein the first computed digest is generated by a HASHing algorithm, hashing at least one of:

memory store operand data of the first plurality of instructions;

memory read operand data of the first plurality of instructions; and register store operand data of the first plurality of instructions.

8. The computer system according to claim 6, wherein generating the first computed digest comprises generating the first computed digest upon identifying the second indicator and based on a final snapshot of data buffered during the transaction for commitment.

9. The computer system according to claim 6, wherein a token is attached to the reliability digest to identify the digest-generating transaction that saved the reliability digest.

10. The computer system according to claim 6, wherein a token is attached to memory store data to identify the digest-generating and the digest-checking transactions, conflicts are suppressed for memory store data between the digest-generating and the digest-checking transactions identified with the same token.

11. The computer system according to claim 6, wherein the computer system executes both the digest-generating transaction and the digest-checking transactions on a transaction initiation without computer software application modification.

* * * * *